(12) United States Patent
Uchihara et al.

(10) Patent No.: US 11,965,592 B2
(45) Date of Patent: Apr. 23, 2024

(54) BRAKE MECHANISM AND SPEED REDUCING MECHANISM

(71) Applicant: Nabtesco Corporation, Tokyo (JP)

(72) Inventors: Masato Uchihara, Tokyo (JP); Kohei Nagahara, Tokyo (JP); Koji Nakamura, Tokyo (JP); Yuta Nagaya, Tokyo (JP); Mitsuru Shimamoto, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 213 days.

(21) Appl. No.: 17/158,272

(22) Filed: Jan. 26, 2021

(65) Prior Publication Data

US 2021/0239199 A1 Aug. 5, 2021

(30) Foreign Application Priority Data

Jan. 31, 2020 (JP) .................................. 2020-015393
Jul. 10, 2020 (JP) .................................. 2020-119385

(51) Int. Cl.
*F16H 57/10* (2006.01)
*F16H 1/32* (2006.01)

(52) U.S. Cl.
CPC .............. *F16H 57/10* (2013.01); *F16H 1/32* (2013.01); *F16H 2001/323* (2013.01)

(58) Field of Classification Search
CPC ...... F16H 57/10; F16H 2001/323; F16H 1/32; F16H 2057/02069; F16H 2057/02086; F16H 7/02; F16H 7/06; F16D 2121/22; B25J 9/102; B25J 19/0004
See application file for complete search history.

(56) References Cited

U.S. PATENT DOCUMENTS

| 2016/0061291 | A1* | 3/2016 | Mizuhashi | ............ H02K 7/116 475/162 |
| 2016/0061292 | A1 | 3/2016 | Mizuhashi et al. | |
| 2021/0189687 | A1* | 6/2021 | Minamiura | ........... F16H 57/043 |

FOREIGN PATENT DOCUMENTS

| DE | 102015216245 A1 | 3/2016 | |
| JP | 03-000337 U | 1/1991 | |
| JP | 2004-364370 A | 12/2004 | |
| JP | 2005-138275 A | 6/2005 | |
| JP | 2010-264568 A | 11/2010 | |
| JP | 2013103672 A * | 5/2013 | ............. B60B 27/00 |
| JP | 2015-140225 A | 8/2015 | |
| JP | 2016-048098 A | 4/2016 | |
| JP | 5976400 B2 | 8/2016 | |

(Continued)

OTHER PUBLICATIONS

Extended European Search Report dated Sep. 7, 2021, issued in corresponding European Patent Application No. 21154010.9 (including translation of WO 2008/096857 A1) (24 pgs.).

(Continued)

*Primary Examiner* — Justin Holmes
(74) *Attorney, Agent, or Firm* — Pillsbury Winthrop Shaw Pittman, LLP

(57) ABSTRACT

A speed reducing mechanism according to the present invention includes: a speed reducing unit for decelerating input rotation; an accelerating unit for accelerating rotation output from the speed reducing unit; and a brake unit for applying a braking force for braking the accelerating unit.

20 Claims, 14 Drawing Sheets

(56) References Cited

FOREIGN PATENT DOCUMENTS

JP        2018-194121 A     12/2018
WO     2008/096857 A1     8/2008

OTHER PUBLICATIONS

Notice of Reasons for Rejection dated Jan. 9, 2024, issued in corresponding Japanese Patent Application No. 2020-119385 with English translation (8 pgs.).

* cited by examiner

BRAKE MECHANISM AND SPEED REDUCING MECHANISM

CROSS-REFERENCE TO RELATED APPLICATIONS

This application is based on and claims the benefit of priority from Japanese Patent Application Serial Nos. 2020-015393 (filed on Jan. 31, 2020) and 2020-119385 (filed on Jul. 10, 2020), the contents of which are hereby incorporated by reference in their entirety.

TECHNICAL FIELD

The present invention relates to a brake mechanism and a speed reducing mechanism, and in particular to a technique suited for a mechanism having a brake and a speed reducer.

BACKGROUND

An industrial robot or a machine tool sometimes stops operation due to an abnormality such as emergency stop operation or a power failure. At such time, danger may occur if it fails to maintain its posture and hangs down under its own weight. Therefore, a robot is typically provided with a brake for maintaining its posture.

One such example is disclosed in Japanese Patent No. 5976400, in which a robot 1 has a first joint structure 3 including a drive unit 10, and the drive unit 10 includes a motor 20, a brake shaft 25 disposed parallel to a motor shaft 29 of the motor 20, a pulley mechanism 40 connecting between the output shaft 29 and one end portion 25a of the brake shaft 25 so as to transmit rotation of the motor 20 to the brake shaft 25, and an electromagnetic brake 21 and a speed reducer 22 both disposed coaxially with the brake shaft 25.

The speed reducer 22 and the electromagnetic brake 21 are penetrated by a middle portion 25b and the other end portion 25c of the brake shaft 25, respectively, and an output portion 31 of the speed reducer 22 is connected at its periphery to an operating end of a second joint structure 4.

In this configuration, a large-sized brake is needed for braking a large driving force or stopping a large component, and thus it has been demanded to downsize the brake. In particular, it has been demanded to downsize the brake without reducing its braking ability, so as to prevent loss of the driving force of the drive side.

SUMMARY

One object of the present invention is to provide a downsized speed reducing mechanism having a sufficient braking ability.

A speed reducing mechanism according to one aspect of the present invention comprises: a speed reducing unit for decelerating input rotation; an accelerating unit for accelerating rotation from the speed reducing unit; and a brake unit for applying a braking force to the accelerating unit, wherein the accelerating unit is braked by the braking force of the brake unit. With this arrangement, the object mentioned above is achieved.

In braking a speed reducing unit that receives input rotation from a driving source such as a motor, the brake unit is typically required to produce a braking force necessary for braking the rotation decelerated by the speed reducing unit. Therefore, a large braking torque is required, and thus the brake unit needs to have a large size. On the other hand, in the speed reducing mechanism according to one aspect of the present invention, the rotation from the speed reducing unit is accelerated, and thus the number of rotations is increased by the accelerating unit, and therefore, the brake unit is only required to produce a braking force necessary for braking the accelerated rotation. This reduces the necessary braking torque and thus reduces the size of the brake unit.

The speed reducing mechanism of the present invention may be configured as follows: the speed reducing unit has a speed reducing central axis that constitutes a rotation center, the accelerating unit and the brake unit are connected to each other via gears having rotation axes parallel to each other, and the accelerating unit and the brake unit are positioned to overlap each other in an axial direction along the rotation axis.

The speed reducing mechanism of the present invention may be configured as follows: the speed reducing unit has a speed reducing central axis that constitutes a rotation center, the speed reducing unit and the brake unit are positioned to overlap each other in a circumferential direction around the rotation axis.

The speed reducing mechanism of the present invention may be configured as follows: the speed reducing unit includes a center gear configured to rotate about the speed reducing central axis, the brake unit includes a brake idler gear having a rotation axis parallel to the center gear and rotated by the center gear, and the brake unit brakes the brake idler gear.

The speed reducing mechanism of the present invention may be configured as follows: the speed reducing unit includes a center gear and a spur gear, the center gear rotating about the speed reducing central axis, the spur gear having a rotation axis parallel to the center gear and rotated by the center gear, and the brake unit brakes the spur gear.

The speed reducing mechanism of the present invention may be configured as follows: the speed reducing unit includes a center gear configured to rotate about the speed reducing central axis, and the brake unit brakes the center gear.

The speed reducing mechanism of the present invention may be configured as follows: the speed reducing unit includes a center gear and an outer cylinder, the center gear rotating about the speed reducing central axis, the outer cylinder being rotated about the speed reducing central axis by the center gear, and the brake unit brakes the outer cylinder.

The speed reducing mechanism of the present invention may be configured as follows: the speed reducing mechanism comprises another accelerating unit for accelerating output rotation of the speed reducing unit, and the braking force of the brake unit is applied to the other accelerating unit.

The speed reducing mechanism of the present invention may be configured as follows: the speed reducing unit includes a center gear and an outer cylinder, the center gear rotating about the speed reducing central axis, the outer cylinder being rotated about the speed reducing central axis by the center gear, the speed reducing mechanism further comprises: a first output shaft rotated by the outer cylinder; a second output shaft parallel to the first output shaft; a first output gear and a second output gear connecting between the first output shaft and the second output shaft and configured to transmit rotation therebetween; and another accelerating unit connected to the second output shaft and configured to accelerate an output of the speed reducing unit, and the other accelerating unit is braked by the braking force of the brake unit connected to the other accelerating unit.

The speed reducing mechanism of the present invention may be configured as follows: the first output shaft is connected at one end thereof to a rotational driving source for inputting a rotational driving force via the speed reducing unit, the first output shaft is connected at the other end thereof to the other accelerating unit via the first output gear and the second output gear, and the first output shaft includes a tilting portion between the one end and the other end thereof.

The speed reducing mechanism of the present invention may be configured as follows: the speed reducing mechanism further comprises a leg portion rotatably supporting the first output shaft serving as a tilting shaft, and the leg portion supports the second output shaft and the brake unit.

A speed reducing mechanism according to one aspect of the present invention comprises: a speed reducing unit for decelerating input rotation; an accelerating unit for accelerating rotation from the speed reducing unit; and a brake unit for applying a braking force to the accelerating unit, wherein the speed reducing unit includes: a center gear configured to rotate about a speed reducing central axis that constitutes a rotation center of the speed reducing unit; an idler gear connected to the center gear; a crankshaft integrated with the idler gear; a cam provided on the crankshaft; an external-tooth gear configured to oscillate and rotate around the speed reducing central axis by the cam; and an outer cylinder including an internal-tooth gear meshing with the external-tooth gear and configured to rotate around the speed reducing central axis, wherein the speed reducing mechanism further comprises: a first output shaft rotated by the outer cylinder; a second output shaft parallel to the first output shaft; a first output gear and a second output gear connecting between the first output shaft and the second output shaft and configured to transmit rotation therebetween; and another accelerating unit connected to the second output shaft and configured to accelerate an output of the speed reducing unit, wherein the first output shaft is connected at one end thereof to a rotational driving source for inputting a rotational driving force via the speed reducing unit, wherein the first output shaft is connected at the other end thereof to the other accelerating unit via the first output gear and the second output gear, wherein the first output shaft includes a tilting portion between the one end and the other end thereof, wherein the speed reducing mechanism further comprises a leg portion rotatably supporting the first output shaft serving as a tilting shaft, wherein the leg portion supports the second output shaft and the brake unit, and wherein the other accelerating unit is braked by the braking force of the brake unit connected to the other accelerating unit. In the speed reducing mechanism according to one aspect of the present invention, the rotation from the speed reducing unit is accelerated, and thus the number of rotations is increased by the other accelerating unit, and therefore, the brake unit is only required to produce a braking force necessary for braking the accelerated rotation. This reduces the necessary braking torque and thus reduces the size of the brake unit.

A speed reducing mechanism according to another aspect of the present invention comprises: a brake mechanism including an accelerating unit for accelerating input rotation and a brake unit for applying a braking force for braking the accelerating unit; and a speed reducing unit for decelerating input rotation, wherein the brake mechanism is connected to the speed reducing unit. With this arrangement, the object mentioned above is achieved.

In the speed reducing mechanism according to the other aspect of the present invention, the accelerating unit enlarges the braking force, or the braking torque of the brake unit for application. This allows a small brake unit to apply a braking torque necessary to produce a large braking force required. Accordingly, it is possible to reduce the size, save the space, reduce the number of components, and ensure the braking ability.

The speed reducing mechanism according to the other aspect of the present invention may be configured as follows: the speed reducing mechanism comprises a speed reducing unit for decelerating input rotation, and the brake mechanism described above is connected to the speed reducing unit.

The speed reducing mechanism of the present invention may be configured as follows: the speed reducing unit has a speed reducing central axis that constitutes a rotation center, and the speed reducing unit and the accelerating unit are positioned to overlap each other in an axial direction along the speed reducing central axis.

The speed reducing mechanism of the present invention may be configured as follows: an axis of the accelerating unit and the speed reducing central axis are parallel to each other.

The speed reducing mechanism of the present invention may be configured as follows: an axis of the accelerating unit and the speed reducing central axis intersect each other.

The speed reducing mechanism of the present invention may be configured as follows: the speed reducing unit and the accelerating unit are connected to each other via a rotation transmitting portion.

The speed reducing mechanism of the present invention may be configured as follows: the rotation transmitting portion is formed of any one of: a brake output gear; a brake output pulley and a belt; and a brake output sprocket and a chain, so as to connect between the speed reducing unit and the accelerating unit.

The speed reducing mechanism of the present invention may be configured as follows: the rotation transmitting portion is connected to a periphery of the speed reducing unit.

The speed reducing mechanism of the present invention may be configured as follows: the speed reducing unit includes an outer cylinder configured to rotate about the speed reducing central axis, and the brake mechanism brakes the outer cylinder.

The speed reducing mechanism of the present invention may be configured as follows: the speed reducing unit includes an output shaft rotated by the outer cylinder, the brake mechanism includes a brake shaft of the brake mechanism parallel to the output shaft, the rotation transmitting portion is connected to the output shaft and the brake shaft and configured to transmit rotation therebetween, the accelerating unit of the brake mechanism is connected to the brake shaft and configured to accelerate an output of the speed reducing unit, and the speed reducing unit is braked by the braking force of the brake unit of the brake mechanism.

The speed reducing mechanism of the present invention may be configured as follows: the output shaft is connected at one end thereof to a rotational driving source for inputting a rotational driving force via the speed reducing unit, the output shaft is supported at the other end thereof by a bearing, the output shaft includes a tilting portion between the one end and the other end thereof, the speed reducing mechanism further comprises a leg portion rotatably supporting the output shaft serving as a tilting shaft, and the leg portion supports the brake shaft and the brake unit.

In the speed reducing mechanism according to one aspect of the present invention, the input rotation input from a driving source such as a motor and decelerated by the speed reducing unit rotates the first output shaft serving as a tilting shaft and sets the tilt angle thereof. The tilting portion is thus retained at or rotated to a predetermined angle. At this time, the tilting shaft is braked by the main brake. Further, when the input rotation input from the driving source such as a motor is not input to the tilting portion, or when the input rotation input to the speed reducing unit is not input to the tilting portion, the rotation of the tilting portion is barked using another accelerating unit. In this case, the braking in the other accelerating unit requires a smaller braking torque than in the case where the speed reducing unit is braked, because the rotation is accelerated by the accelerating unit before it is braked. Therefore, the brake unit can be downsized. In addition, since the leg portion supports the second output shaft and the brake unit, it is possible to save the space.

Advantageous Effects

The present invention provides a speed reducing mechanism occupying a small space, including a downsized brake unit, and having a sufficient braking ability.

DESCRIPTION OF THE EMBODIMENTS

Figure 1:
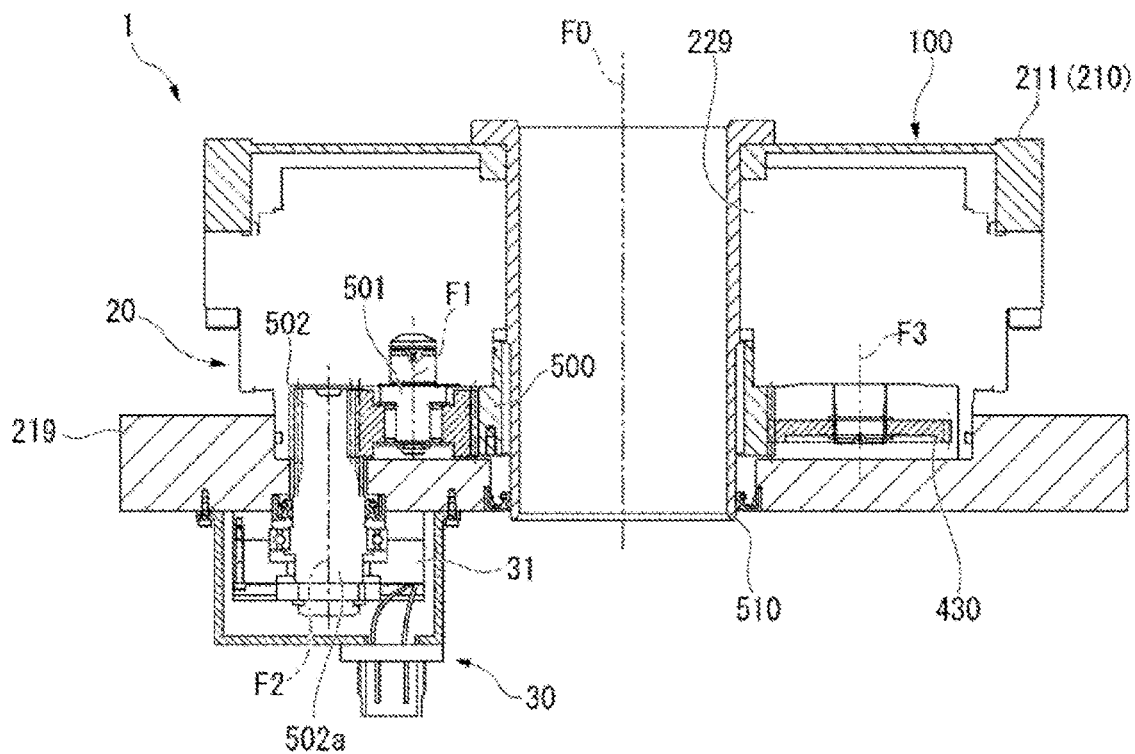
FIG. 1 is a schematic sectional view of a first embodiment of a speed reducing mechanism according to the present invention, shown along a speed reducing central axis, and FIG. 1 corresponds to the I-I line in FIG. 3.
Figure 2:
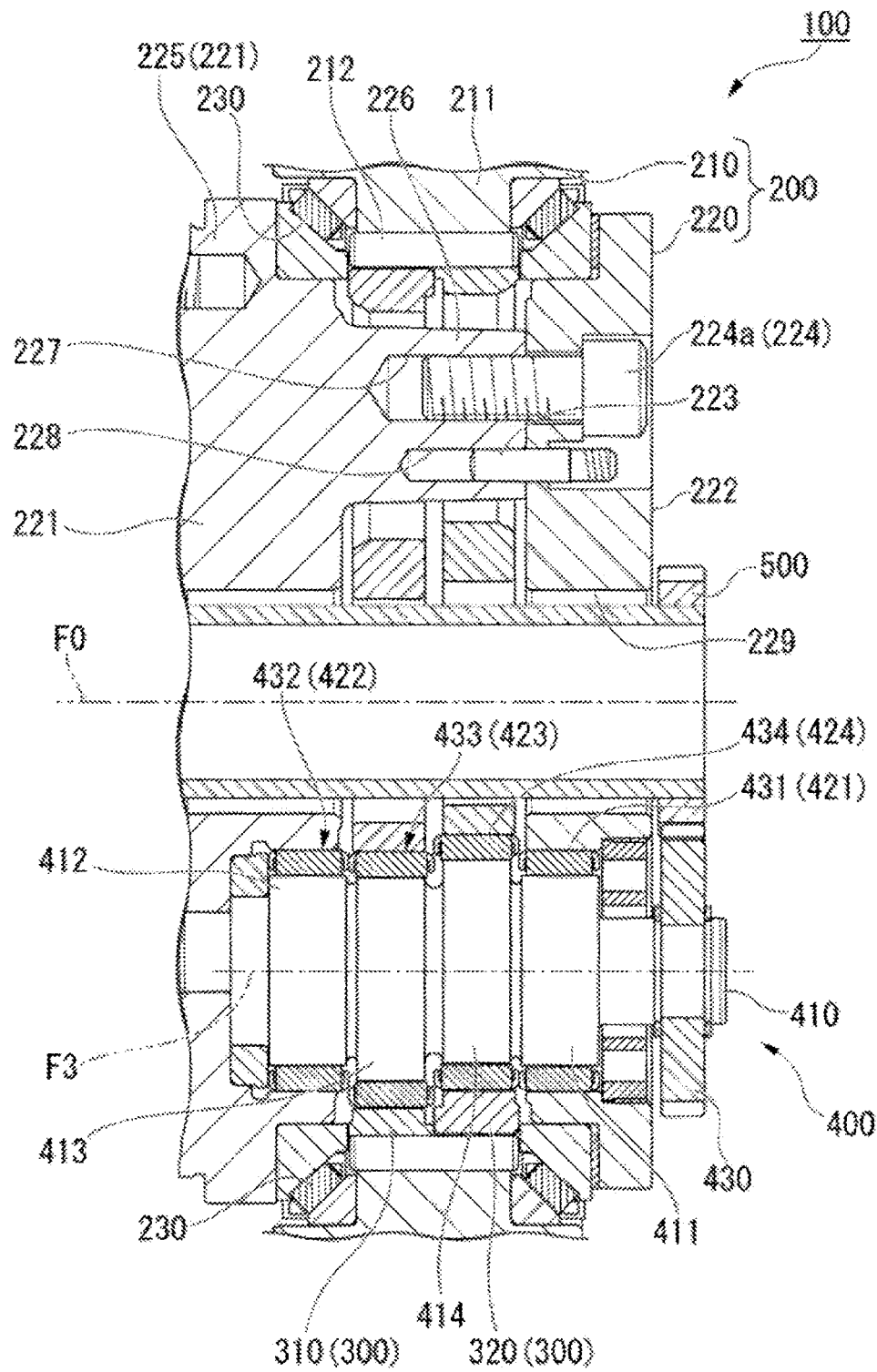
FIG. 2 is a sectional view of a speed reducing unit in the first embodiment of the speed reducing mechanism according to the present invention, as viewed along to the speed reducing central axis.
Figure 3:
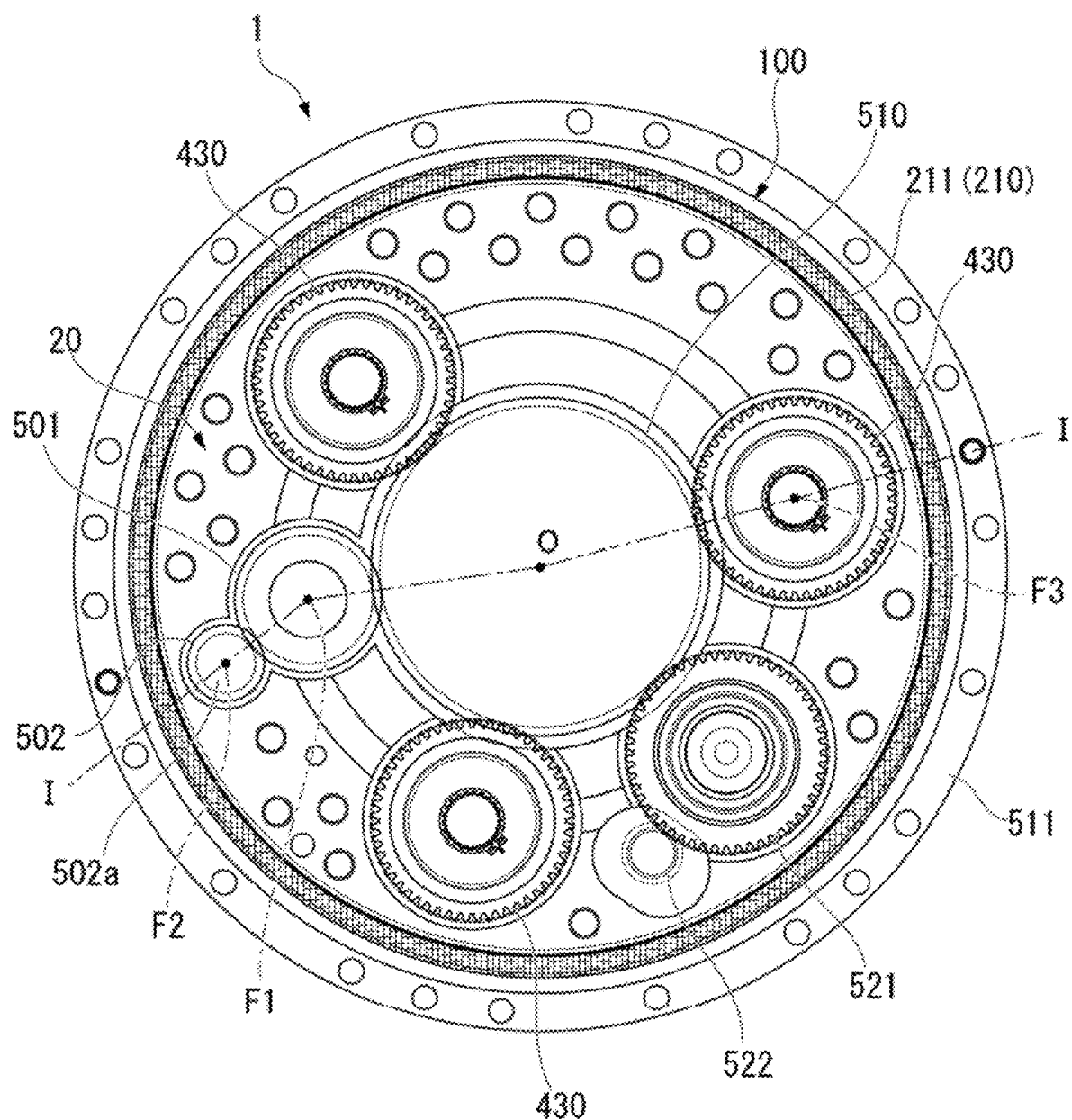
FIG. 3 is a cross-sectional view of a speed reducing unit in the first embodiment of the speed reducing mechanism according to the present invention, shown along the axial direction.

A first embodiment of a speed reducer according to the invention will be hereinafter described with reference to the accompanying drawings. In these drawings, members are shown to different scales into recognizable sizes. The dimensions of the components and ratios thereof are different from those of the actual components. FIG. 1 is a schematic sectional view of a speed reducing mechanism according to the present embodiment, shown along an axial direction, FIG. 2 is a sectional view of the speed reducing unit in the speed reducing mechanism according to the present embodiment, as viewed along the axial direction, and FIG. 3 is a schematic cross-sectional view of the speed reducing unit in the speed reducing mechanism according to the present embodiment, shown along the axial direction. In these drawings, reference sign 1 denotes the speed reducing mechanism.

As shown in FIGS. 1 and 2, the speed reducing mechanism 1 according to the embodiment includes a speed reducing unit (speed reducer) 100 for decelerating the input rotation, an accelerating unit 20 for accelerating the input rotation from a center gear 500 included in the speed reducing unit 100, and a brake unit 30 for applying a braking force to the accelerating 20.

The speed reducing unit 100 is constituted by an eccentric oscillating speed reducer. As shown in FIGS. 2 and 3, the speed reducer 100 includes a cylindrical housing 200, a gear portion (an external-tooth member) 300, three crank assemblies 400, and the center gear 500. The cylindrical housing 200 houses therein the gear portion 300 and three crank assemblies 400. Note that some components are omitted or deformed in FIG. 3.

The cylindrical housing 200 includes a casing (outer cylindrical portion) 210, a carrier portion (carrier) 220, and two main bearings 230. The carrier portion 220 is disposed inside the casing (outer cylindrical portion) 210. The two main bearings 230 are disposed between the casing (outer cylindrical portion) 210 and the carrier portion 220. The two main bearings 230 allow the relative rotation of the casing (outer cylindrical portion) 210 and the carrier portion 220. In this embodiment, one of the casing (outer cylindrical portion) 210 and the carrier portion 220 represents an example of the output portion of the speed reducer 100.

As shown in FIGS. 1 to 3, the speed reducer 100 has a speed reducing central axis (central axis) F0 defined as the central axis of rotation for the two main bearings 230. When the carrier portion 220 is stationary, the casing (outer cylindrical portion) 210 rotates about the main axis F0. In other words, one of the casing (outer cylindrical portion) 210 and the carrier portion 220 can rotate relative to the other around the main axis F0. In the embodiment, the axial direction refers to the direction along the central axis (main axis) F0 of the speed reducer 100 as the axis of rotation for the two main bearings 230.

The casing (outer cylindrical portion) 210 includes an outer cylinder 211 and a plurality of internal tooth pins (internal teeth) 212. The outer cylinder 211 forms a cylindrical internal space that contains the carrier portion 220, the gear portion 300 and the crank assemblies 400. The internal tooth pins 212 are columnar members extending substantially parallel to the main axis F0. The internal tooth pins 212 are fitted in grooves formed in the inner wall of the outer cylinder 211. Therefore, the internal tooth pins 212 are appropriately retained by the outer cylinder 211.

The plurality of internal tooth pins 212 are arranged at substantially regular intervals around the rotation axis F0. Each internal tooth pin 212 has a semicircle surface projecting from the inner wall of the outer cylinder 211 toward the main axis F0. Therefore, the plurality of internal tooth pins 212 serve as internal teeth meshing with the gear portion 300.

The carrier portion 220 includes a base portion (first member) 221, an end plate portion (second member) 222, a positioning pin 223 and a support bolt (fixing bolt) 224. The carrier portion 220 as a whole has a cylindrical shape. The carrier portion 220 has a through hole 229 formed therein, which is centered around the main axis F0. The through hole 229 is penetrated by an inner cylinder 510. The inner cylinder 510 is centered around the main axis F0.

The base portion (first member) 221 includes a base plate portion 225 and three shaft portions 226. Each of the three shaft portions 226 extends from the base plate portion 225 toward the end plate portion (second member) 222. The distal end surface of each of the three shaft portions 226 has a screw hole 227 and a reaming hole 228 formed therein. The positioning pin 223 is inserted into the reaming hole 228. This in turn accurately positions the end plate portion (second member) 222 relative to the base portion (first member) 221.

The support bolt 224 is fastened into the screw hole 227. This in turn appropriately fixes the end plate portion (second member) 222 to the base portion (first member) 221. The fixation between the base portion (first member) 221 and the end plate portion (second member) 222 by the support bolt 224 is set to produce a predetermined preload. The end plate portion (second member) 222 is referred to as a hold.

The gear portion 300 is disposed between the base plate portion 225 and the end plate portion (second member) 222. The three shaft portions 226 extend through the gear portion 300 and are connected to the end plate portion (second member) 222. The gear portion 300 includes two gears 310 and 320. The gear 310 is disposed between the base plate portion 225 and the gear 320. The gear 320 is disposed between the end plate portion (second member) 222 and the gear 310.

The gear 310 has substantially the same shape and size as the gear 320. The gears 310 and 320 revolve relative to the outer cylinder 211 within the outer cylinder 211 while meshing with the internal tooth pins 212. Accordingly, the respective centers of the gears 310 and 320 and the outer cylinder 211 revolve about the main axis F0 relative to each other.

The revolution of the gear 310 is out of phase with the revolution of the gear 320 substantially by 180°. While the gear 310 meshes with half of the internal tooth pins 212 of the casing (outer cylindrical portion) 210, the gear 320 meshes with the remaining half of the internal tooth pins 212. In this way, the gear portion 300 can rotate one of the casing (outer cylindrical portion) 210 and the carrier portion 220.

In the present embodiment, the gear portion 300 includes the two gears 310 and 320. The gear portion 300 may alternatively include more than two gears. As another alternative example, the gear portion 300 may include a single gear.

Each of the three crank assemblies 400 includes a crankshaft 410, four bearings 421, 422, 423 and 424 and a transmission gear (external teeth) 430. It may also be possible that the transmission gear (spur gear) 430 is formed of a spur gear in general use. In the speed reducer 100 relating to the present embodiment, the transmission gear 430 is not limited to any particular type.

The transmission gear (spur gear) 430 receives the driving force generated by a driving source (such as a motor) directly from the center gear 500. The transmission gear (spur gear) 430 has a rotation axis F3 parallel to the speed reducing central axis (central axis) F0.

As shown in FIGS. 2 and 3, the crankshaft 410 rotates about the crank axis (transmission axis) F3. The transmission axis F3 is substantially parallel to the main axis F0. The crankshaft 410 includes two journals (crank journals) 411, 412 and two eccentric portions (eccentric members) 413, 414. The journals 411, 412 extend along the transmission axis F3. The central axis of the journals 411, 412 coincides with the transmission axis F3. The eccentric portions 413, 414 are formed between the journals 411 and 412. Each of the eccentric portions 413 and 414 is eccentrically arranged with respect to the transmission axis F3.

The journal 411 is inserted into the bearing 421. The bearing 421 is arranged between the journal 411 and the end plate portion (second member) 222. Accordingly, the journal 411 is retained by the end plate portion (second member) 222 and the bearing 421. The journal 412 is inserted into the bearing 422. The bearing 422 is arranged between the journal 412 and the base portion (first member) 221. Accordingly, the journal 412 is retained by the base portion (first member) 221 and the bearing 422. In the present embodiment, the bearing 421 is a needle bearing with a plurality of needles 431 arranged around the journal 411. The bearing 422 is a needle bearing with a plurality of needles 432 arranged around the journal 412.

The eccentric portion 413 is inserted into the bearing 423. The bearing 423 is disposed between the eccentric portion 413 and the gear 310. The eccentric portion 414 is inserted into the bearing 424. The bearing 424 is disposed between the eccentric portion 414 and the gear 320. In the present embodiment, the bearing 423 is a needle bearing with a plurality of needles 433 arranged around the eccentric portion (eccentric members) 413. The bearing 424 is a needle bearing with a plurality of needles 434 arranged around the eccentric portion (eccentric member) 414.

As driving force is input into the transmission gear 430, the crankshaft 410 rotates about the transmission axis F3. This in turn causes the eccentric portions 413, 414 to eccentrically rotate about the transmission axis F3. The gears 310, 320, which are connected to the eccentric portions 413, 414 via the bearings 423, 424, resultantly oscillate within the circular space defined by the casing (outer cylindrical portion) 210. As the gears 310, 320 mesh with the internal tooth pins 212, relative rotation between the casing (outer cylindrical portion) 210 and the carrier portion 220 is caused.

The center gear 500 is rotatably supported on the outer periphery of the inner cylinder 510. The center gear 500 is centered around the main axis F0. The center gear 500 meshes with the transmission gear 430. The center gear 500 meshes with a drive gear 521, as shown in FIG. 3. The drive gear 521 is connected to the driving source (such as a motor) via a drive gear 522. The center gear 500 directly or indirectly receives the driving force generated by the driving source (such as a motor) via the drive gear 521, 522. The center gear 500 transmits a rotational driving force (input rotation) to the transmission gear 430.

In the speed reducing unit 100, the rotational driving force (input rotation) transmitted from the driving source (such as a motor) to the center gear 500 via the drive gears 521, 522 is output from the outer cylinder 211 at a reduced speed. The speed reducing unit 100 is capable of setting an appropriate one of transmission paths for the driving force from the driving source to the transmission gear 430 depending on the environment in which and conditions under which it is used. Accordingly, the speed reducing unit 100 of the present embodiment may employ any speed-reducing drive transmission path that extends from the driving source to the transmission gear 430, including the one described above.

The center gear 500 meshes with a brake idler gear 501, as shown in FIGS. 1 and 2. The brake idler gear 501 has a rotation axis F1 parallel to the speed reducing central axis (central axis) F0. The brake idler gear 501 is shaped, positioned, and provided with a gear ratio so as to accelerate the drive rotation from the center gear 500. The brake idler gear 501 may be supported by the carrier portion 220.

The brake idler gear 501 meshes with a brake gear 502. The brake gear 502 has a rotation axis F2 parallel to the speed reducing central axis (central axis) F0. The brake gear 502 is shaped, positioned, and provided with a gear ratio so as to accelerate the drive rotation from the brake idler gear 501. The brake gear 502 may be positioned radially outside the brake idler gear 501 with respect to the speed reducing central axis (central axis) F0.

The brake gear 502 is connected with a non-excitation brake 31. The non-excitation brake 31 is connected with a brake power source (not shown). Specifically, the non-excitation brake 31 may include a brake disc integrally connected with a rotary shaft 502a of the brake gear 502, a torque spring that is contracted by a coil when energized, and an armature that is pressed against the brake disc by the torque spring expanded when de-energized. This configuration is not limitative, and any known non-excitation brake may be used.

The brake idler gear 501 and the brake gear 502 are supported by a mounting flange 219. The non-excitation brake 31 brakes the brake idler gear 501 via the brake gear 502. The non-excitation brake 31 and the brake gear 502 constitute the brake unit 30. The non-excitation brake 31 and the brake gear 502 are positioned radially outside the center gear 500. In this arrangement, the speed reducing unit 100 and the brake unit 30 overlap each other in the circumferential direction.

The center gear 500, the brake idler gear 501, and the brake gear 502 constitute the accelerating unit 20. The accelerating unit 20 accelerates the rotational drive (input rotation) from the center gear 500 and transmits it to the brake unit 30, in the speed-reducing drive transmission path from the center gear 500 to the outer cylinder 211 within the speed reducing unit 100.

In the speed reducing mechanism 1 of the present embodiment, the center gear 500, the brake idler gear 501, and the brake gear 502 are positioned at substantially the same plane and are meshed with each other. In this way, the brake unit 30 is positioned to overlap the accelerating unit 20 in the axial direction along the speed reducing central axis (central axis) F0. In other words, the brake unit 30 overlaps the accelerating unit 20 in the axial direction along the speed reducing central axis (central axis) F0. Accordingly, in the speed reducing mechanism 1 of the present embodiment, the brake unit 30 is not positioned away from the speed reducing unit 100 in the axial direction along the speed reducing central axis (central axis) F0, and thus the speed reducing mechanism 1 can be downsized in the direction along the speed reducing central axis (central axis) F0.

The brake gear 502 brakes, by the braking force of the non-excitation brake 31, the rotational driving force (input rotation) transmitted from the driving source (such as a motor) to the center gear 500. At this time, the braking in the accelerating unit 20 by the non-excitation brake 31 requires a smaller braking force than in the case where the center gear 500 is braked directly, because the rotational driving force (input rotation) is accelerated, or its torque is reduced, while being transmitted by the brake gear 502 and the brake idler gear 501. Accordingly, the non-excitation brake 31 can be downsized. In this way, since the brake unit 30 is provided on the input side, the speed reducing mechanism 1 of the present embodiment can be downsized and thus provides better work efficiency.

Figure 4:
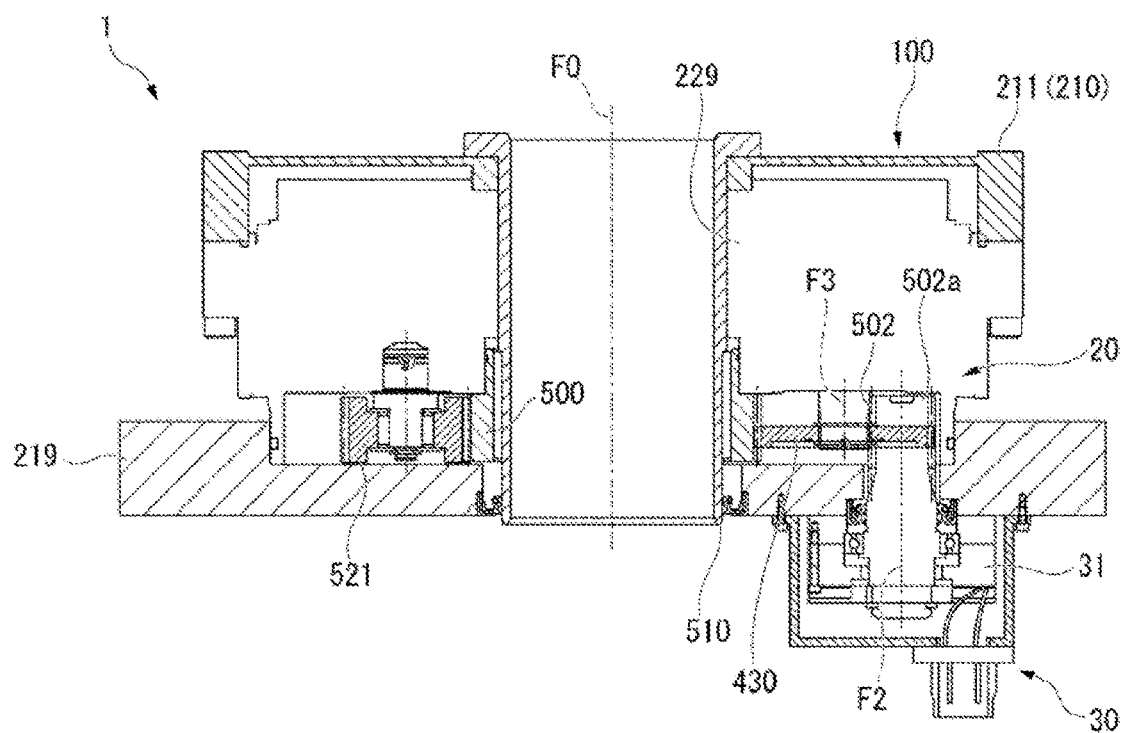
FIG. 4 is a schematic sectional view of a second embodiment of the speed reducing mechanism according to the present invention, shown along the speed reducing central axis.

A second embodiment of the speed reducing mechanism according to the invention will be hereinafter described with reference to the accompanying drawings. FIG. 4 is a sectional view showing the speed reducing mechanism of the present embodiment. The present embodiment is different from the first embodiment described above in the connection position between the brake unit and the speed reducing unit. Except for this difference, the present embodiment includes the same constituents as in the first embodiment, which are denoted by the same reference numerals and are not described here.

In the present embodiment, the brake gear 502 meshes with one transmission gear (spur gear) 430, as shown in FIG. 4. The brake gear 502 has a rotation axis F2 parallel to the speed reducing central axis (central axis) F0. The brake gear 502 is shaped, positioned, and provided with a gear ratio so as to accelerate the drive rotation from the transmission gear (spur gear) 430.

The brake gear 502 may be positioned such that its radial distance to the speed reducing central axis (central axis) F0 is equal to or smaller than that of the transmission gear (spur gear) 430. In other words, the brake gear 502 may be positioned such that the radial distance from the speed reducing central axis (central axis) F0 to the rotation axis F2 of the brake gear 502 is equal to or smaller than the radial distance from the speed reducing central axis (central axis) F0 to the rotation axis F3 of the transmission gear (spur gear) 430.

As in the first embodiment, the brake gear 502 is connected with the non-excitation brake 31. The non-excitation brake 31 is connected with a brake power source (not shown). The non-excitation brake 31 is not limited to a particular configuration but may be formed of any known non-excitation brake. The brake gear 502 is supported by the mounting flange 219. The non-excitation brake 31 and the brake gear 502 constitute the brake unit 30. The non-excitation brake 31 brakes the transmission gear (spur gear) 430 via the brake gear 502.

The center gear 500, the transmission gear (spur gear) 430, and the brake gear 502 constitute the accelerating unit 20. The accelerating unit 20 accelerates the rotational drive (input rotation) from the center gear 500 and transmits it to the brake unit 30, in the speed-reducing drive transmission path from the center gear 500 to the outer cylinder 211 within the speed reducing unit 100.

In the speed reducing mechanism 1 of the present embodiment, the center gear 500, the transmission gear (spur gear) 430, and the brake gear 502 are positioned at substantially the same plane and are meshed with each other. In this way, the brake unit 30 is positioned to overlap the accelerating unit 20 in the axial direction along the speed reducing central axis (central axis) F0. In other words, the brake unit 30 overlaps the accelerating unit 20 in the axial direction along the speed reducing central axis (central axis) F0. Accordingly, in the speed reducing mechanism 1 of the present embodiment, the brake unit 30 is not positioned away from the speed reducing unit 100 in the axial direction along the speed reducing central axis (central axis) F0, and thus the speed reducing mechanism 1 can be downsized in the direction along the speed reducing central axis (central axis) F0. In this way, since the brake unit 30 is provided on the input side, the speed reducing mechanism 1 of the present embodiment can be downsized and thus provides better work efficiency.

The brake gear 502 brakes, by the braking force of the non-excitation brake 31, the rotational driving force (input rotation) transmitted from the driving source (such as a motor) to the transmission gear (spur gear) 430. At this time, the braking in the accelerating unit 20 by the non-excitation brake 31 requires a smaller braking force than in the case where the center gear 500 is braked directly, because the rotational driving force (input rotation) is accelerated, or its torque is reduced, while being transmitted by the brake gear 502 and the transmission gear (spur gear) 430. Accordingly, the non-excitation brake 31 can be downsized. In the speed reducing mechanism 1 of the present embodiment, the center gear 500, the transmission gear (spur gear) 430, and the brake gear 502 constitute the accelerating unit 20, so as to reduce the number of parts.

Figure 5:
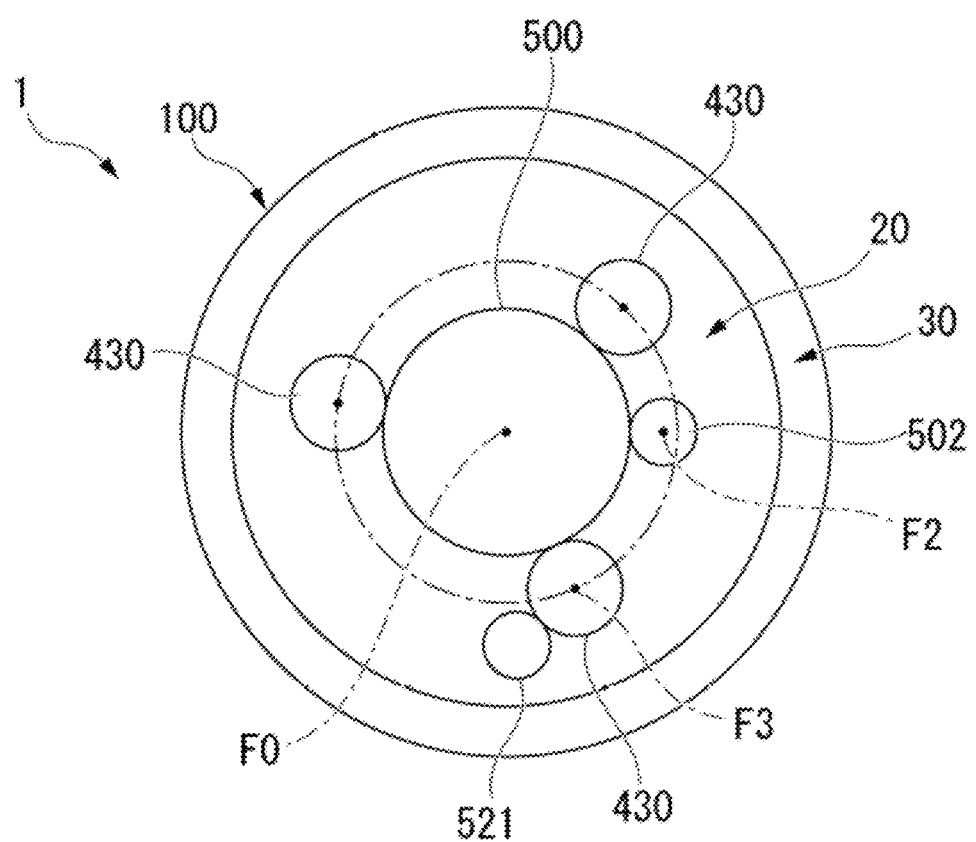
FIG. 5 is a sectional view of a third embodiment of the speed reducing mechanism according to the present invention, as viewed in the direction along the speed reducing central axis.

A third embodiment of the speed reducing mechanism according to the invention will be hereinafter described with reference to the accompanying drawings. FIG. 5 is a schematic sectional view showing the speed reducing mechanism of the present embodiment, as viewed in the direction along the axial direction. The present embodiment is different from the first and second embodiments described above in the connection position between the brake unit and the speed reducing unit. Except for this difference, the present embodiment includes the same constituents as in the first embodiment, which are denoted by the same reference numerals and are not described here.

In the present embodiment, the brake gear 502 meshes directly with the center gear 500, as shown in FIG. 5. The brake gear 502 has a rotation axis F2 parallel to the speed reducing central axis (central axis) F0. The brake gear 502 is shaped, positioned, and provided with a gear ratio so as to accelerate the drive rotation from the center gear 500.

The brake gear 502 may be positioned such that its radial distance to the speed reducing central axis (central axis) F0 is equal to or smaller than that of the transmission gear (spur gear) 430. In other words, the brake gear 502 may be positioned such that the radial distance from the speed reducing central axis (central axis) F0 to the rotation axis F2 of the brake gear 502 is equal to or smaller than the radial distance from the speed reducing central axis (central axis) F0 to the rotation axis F3 of the transmission gear (spur gear) 430.

As in the first embodiment, the brake gear 502 is connected with the non-excitation brake 31. The non-excitation brake 31 is connected with a brake power source (not shown). The non-excitation brake 31 is not limited to a particular configuration but may be formed of any known non-excitation brake. The brake gear 502 is supported by the mounting flange 219. The non-excitation brake 31 and the brake gear 502 constitute the brake unit 30. The non-excitation brake 31 brakes the center gear 500 via the brake gear 502.

The center gear 500 and the brake gear 502 constitute the accelerating unit 20. The accelerating unit 20 accelerates the rotational drive (input rotation) from the center gear 500 and transmits it to the brake unit 30, in the speed-reducing drive transmission path from the center gear 500 to the outer cylinder 211 within the speed reducing unit 100.

In the speed reducing mechanism 1 of the present embodiment, the center gear 500 and the brake gear 502 are positioned at substantially the same plane and are meshed with each other. In this way, the brake unit 30 is positioned to overlap the accelerating unit 20 in the axial direction along the speed reducing central axis (central axis) F0. In other words, the brake unit 30 overlaps the accelerating unit 20 in the axial direction along the speed reducing central axis (central axis) F0. Accordingly, in the speed reducing mechanism 1 of the present embodiment, the brake unit 30 is not positioned away from the speed reducing unit 100 in the axial direction along the speed reducing central axis (central axis) F0, and thus the speed reducing mechanism 1 can be downsized in the direction along the speed reducing central axis (central axis) F0. In this way, since the brake unit 30 is provided on the input side, the speed reducing mechanism 1 of the present embodiment can be downsized and thus provides better work efficiency.

The brake gear 502 brakes, by the braking force of the non-excitation brake 31, the rotational driving force (input rotation) transmitted from the driving source (such as a motor) to the center gear 500. This requires a smaller braking force, because the rotational driving force (input rotation) is accelerated, or its torque is reduced, while being transmitted by the brake gear 502. Accordingly, the non-excitation brake 31 can be downsized. In the speed reducing mechanism 1 of the present embodiment, the center gear 500, the transmission gear (spur gear) 430, and the brake gear 502 constitute the accelerating unit 20, so as to reduce the number of parts.

Figure 6:
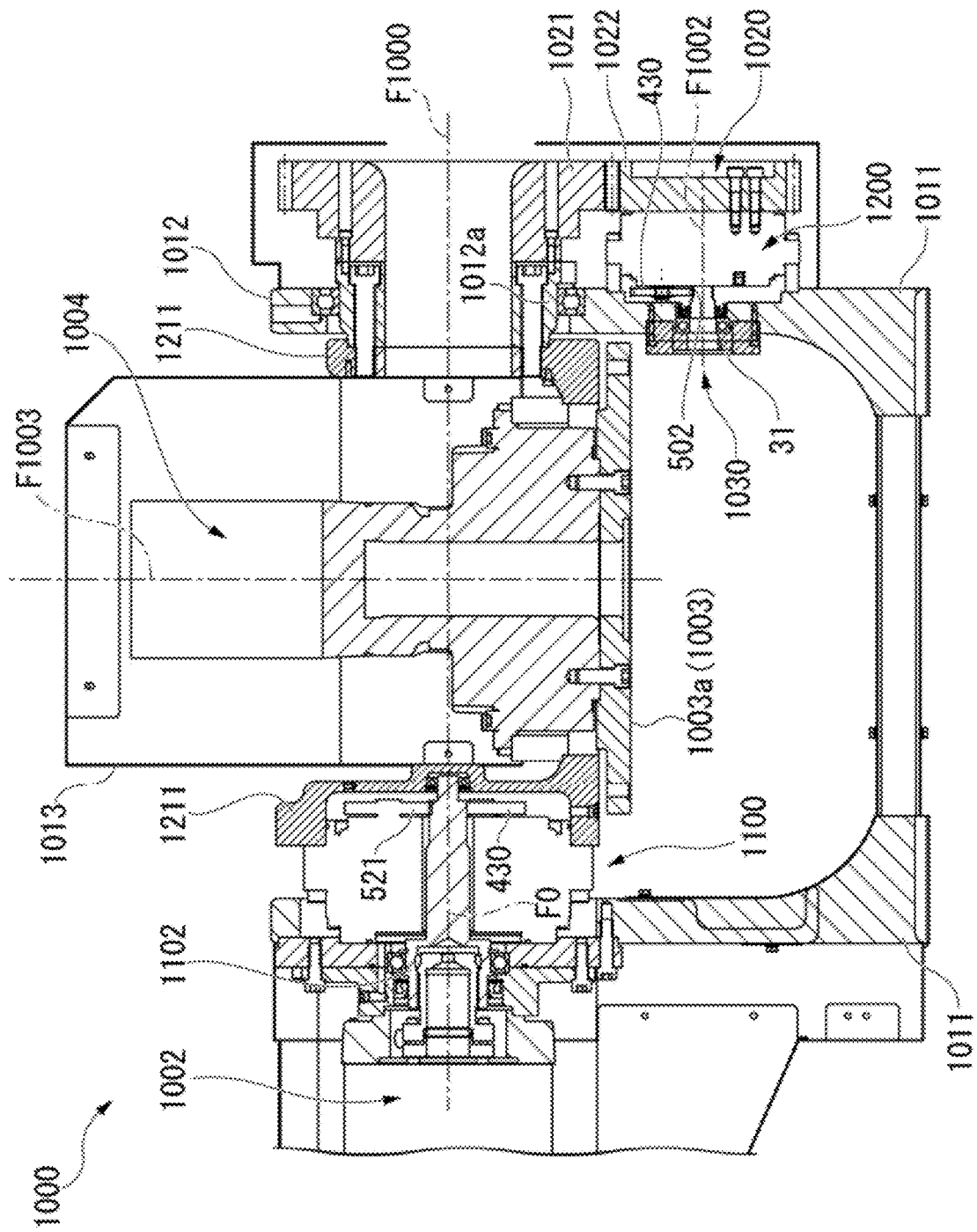
FIG. 6 is a sectional view of a fourth embodiment of the speed reducing mechanism according to the present invention, shown along the axial direction.
Figure 7:
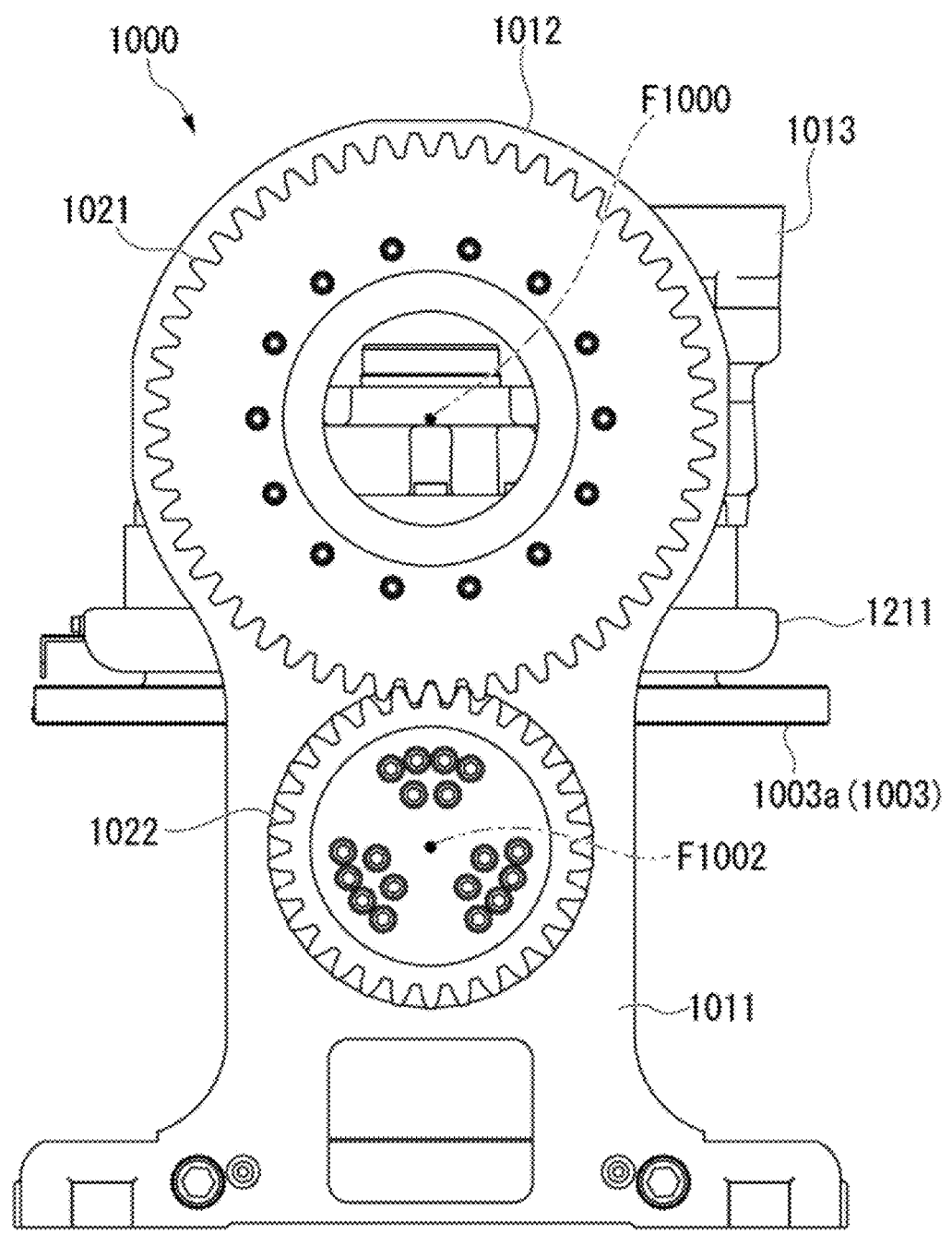
FIG. 7 is a side view of the fourth embodiment of the speed reducing mechanism according to the present invention, as viewed in the axial direction.

A fourth embodiment of the speed reducing mechanism according to the invention will be hereinafter described with reference to the accompanying drawings. FIG. 6 is a schematic sectional view of a speed reducing mechanism according to the present embodiment, shown along an axial direction, and FIG. 7 is a schematic side view of the speed reducing mechanism according to the present embodiment, as viewed in the axial direction. For the present embodiment, the same constituents as in the first to third embodiments described above are denoted by the same reference numerals and are not described here.

A manufacturing apparatus (speed reducing mechanism) 1000 is used for performing cutting, grinding and other processes, welding, assembling and the like on a work placed on the turntable 1003. The turntable 1003 rotates about a table axis F1003, and the table axis F1003 in turn rotates about a horizontal axis F1000.

As shown in FIGS. 6 and 7, the manufacturing apparatus 1000 includes: a base block (leg portion) placed on a floor surface; a speed reducing unit (speed reducer) 1100 fixed to an upper surface of the base block 1011 on one end side in the direction of the horizontal axis F1000; a motor (rotational driving source) 1002 for outputting motive power to the speed reducer 1100; a retainer 1012 fixed to the upper surface of the base block 1011 on the other end side in the direction of the horizontal axis F1000; and a rotary block (tilting portion) 1013 supported at its opposite end portions in the direction of the horizontal axis F1000 by the speed reducer 1100 and the retainer 1012.

The motor 1002 is integrally mounted to the input side of the speed reducer 1100. The motor 1002 may include an emergency brake that operates upon a power failure. The speed reducer 1100 decelerates the rotation of the motor 1002 and transmits the rotation to one end side of the rotary block 1013 in the direction of the horizontal axis F1000. The retainer 1012 rotatably supports the other end side of the rotary block 1013 in the direction of the horizontal axis F1000. The rotary block 1013 receives the motive power from the motor 1002 via the speed reducer 1100 to rotate about the horizontal axis F1000.

The rotary block 1013 includes the turntable 1003 that rotates about the horizontal axis F1000. The turntable 1003 has a work supporting surface 1003a. A work is mounted on the work supporting surface 1003a of the turntable 1003. The rotary block 1013 tilts and rotates about the horizontal axis F1000 by the rotation of the motor 1002. The work mounted on the work supporting surface 1003a of the turntable 1003 is moved toward a working position by the rotation of the rotary block 1013 caused by the motor 1002.

The rotary block 1013 also includes a table driving motor 1004 for rotating the turntable 1003 about the table axis F1003 that is orthogonal to the horizontal axis F1000. The turntable 1003 tilted about the horizontal axis F1000 is rotated about the table axis F1003 by the table driving motor 1004. The work mounted on the work supporting surface 1003a of the turntable 1003 is rotated at the working position by the rotation of the turntable 1003 caused by the table driving motor 1004. At the working position, there may be installed a working device such as a welding robot. FIGS. 6 and 7 show that the work supporting surface 1003a of the turntable 1003 faces downward.

The speed reducer 1100 is fixed at its lower end to the upper surface of the base block (leg portion) 1011 on the one end side. The speed reducer 1100 is disposed on the base block 1011 such that the speed reducing central axis F0 of its output is aligned with the horizontal axis F1000 of the manufacturing apparatus 1000. The speed reducer (speed reducing unit) 1100 is constituted by an eccentric oscillating speed reducer. The speed reducer (speed reducing unit) 1100 is configured in the same manner as the speed reducing unit 100 in the first to third embodiments shown in FIGS. 1 to 5. Although the speed reducer (speed reducing unit) 1100 is a solid speed reducer, it may be a hollow speed reducer, as is the speed reducing unit 100 in the first to third embodiments shown in FIGS. 1 to 5.

The speed reducer (speed reducing unit) 1100 includes an input shaft 1102 connected to the motor 1002. The input shaft 1102 is disposed along the horizontal axis F1000. The speed reducer 1100 includes an output portion 1211 connected to the outer cylinder 211 (see FIGS. 1 to 4). The output portion 1211 rotates at the same speed as the outer cylinder 211 (see FIGS. 1 to 4). The output portion 1211 in the speed reducer (speed reducing unit) 1100 outputs the drive rotation received from the motor 1002 at a reduced speed. The output portion 1211 is built integrally with the rotary block (tilting portion) 1013. The output portion 1211 rotates at the same speed as the rotary block (tilting portion) 1013.

The output portion 1211 and the rotary block (tilting portion) 1013 are integrated together to form a first output shaft. The first output shaft is supported at one end side of the base block 1011 within the speed reducing unit 1100 and is supported by the retainer 1012 at the other end side of the base block 1011. The retainer 1012 is positioned on the upper portion of the base block 1011 and includes a bearing 1012a.

The first output shaft has a first output gear 1021 provided on the other end thereof. The rotation axis of the first output gear 1021 is aligned with the horizontal axis F1000. The first output gear 1021 rotates integrally with the rotary block (tilting portion) 1013 and the output portion 1211. The first output gear 1021 is meshed with a second output gear 1022.

The second output gear 1022 is positioned below the first output gear 1021. The rotation axis of the second output gear 1022 is aligned with an axis F1002 (second output shaft) parallel to the horizontal axis F1000 (first output shaft). The second output gear 1022 is rotatably supported by the base block (leg portion) 1011. The second output gear 1022 is connected to a second accelerating unit (another accelerating unit) 1200. The second output gear 1022 is shaped, positioned, and provided with a gear ratio so as to accelerate the drive rotation from the first output gear 1021.

The second accelerating unit 1200 is supported by the base block (leg portion) 1011. The second accelerating unit 1200 is constituted by an eccentric oscillating speed reducer. The second accelerating unit 1200 is configured in the same manner as the speed reducing unit 100 in the first to third embodiments shown in FIGS. 1 to 5. The second accelerating unit 1200 is connected to a brake unit 1030.

In the second accelerating unit 1200, the second output gear 1022 is connected to the outer cylinder 211 (see FIGS. 1 to 4) positioned on the output side of the second accelerating unit 1200 as a speed reducer. Further, in the second accelerating unit 1200, the brake gear 502 of the brake unit 1030 is connected to the input side of the second accelerating unit 1200 as a speed reducer. A rotational driving force is output from the second accelerating unit 1200 to the brake gear 502 at an increased speed. The brake gear 502 is configured as an accelerating unit 1020.

The brake unit 1030 includes the non-excitation brake 31, as does the brake unit 30 in the first to third embodiments shown in FIGS. 1 to 5. The non-excitation brake 31 is connected with a brake power source (not shown). The non-excitation brake 31 is not limited to a particular configuration but may be formed of any known non-excitation brake. The brake unit 1030 is supported by the base block (leg portion) 1011.

In the transmission path extending from the first output gear 1021 via the second accelerating unit 1200 to the brake unit 1030, at least a part of the second accelerating unit 1200 accelerates the drive rotation and transmits the accelerated drive rotation to the brake unit 1030. In other words, at least a part of the second accelerating unit 1200 and the brake gear 502 operate as the accelerating unit 1020 in the transmission path extending from the second output gear 1022 to the brake unit 1030.

The drive rotation is accelerated when it is transmitted from the first output gear 1021 to the second output gear 1022. Accordingly, in the transmission path extending from the first output gear 1021 to the brake unit 1030, the first output gear 1021, the second output gear 1022, and the second accelerating unit 1200 constitute the accelerating unit 1020. The accelerating unit 1020 accelerates the rotational drive (input rotation) from the outer cylinder 211 (see FIGS. 1 to 4) and transmits it to the brake unit 1030, in the speed-reducing drive transmission path from the speed reducing unit 100 to the outer cylinder 211 (see FIGS. 1 to 4).

In the manufacturing apparatus (speed reducing mechanism) 1000 of the present embodiment, the motor 1002 as the driving source rotates the rotary block (tilting portion) 1013 about the horizontal axis F1000 via the speed reducing unit 1100. At this time, the drive rotation of the motor 1002 is controlled by a signal from a control unit (not shown) such that the rotary block (tilting portion) 1013 is tilted about the horizontal axis F1000 to a predetermined tilt angle. In this way, the work supporting surface 1003a of the turntable 1003 is tilted about the horizontal axis F1000 to the predetermined tilt angle. The control unit controls the motor 1002 to be braked, thereby stopping the rotary block (tilting portion) 1013 to fix its tilt angle.

At this time, when the drive rotation produced by the motor 1002 as the driving source is transmitted via the speed reducing unit 1100 at a reduced speed to rotate and tilt the rotary block (tilting portion) 1013, the first output gear 1021 rotates integrally with the rotary block (tilting portion) 1013 and the output portion 1211. The rotation of the first output gear 1021 is transmitted to the second output gear 1022 at an increased speed. Further, the rotation of the first output gear 1021 is transmitted to the brake unit 1030 via the second output gear 1022 and the second accelerating unit 1200 at an increased speed.

While the motor 1002 as the driving source is supplied with electricity to brake or drive the rotary block (tilting portion) 1013, the brake unit 1030 is also supplied with electricity. The brake unit 1030 operates with a non-excitation brake. Therefore, the brake unit 1030 switches its operation when supplied with electricity in association with the electricity supply to the motor 1002, or the brake unit 1030 switches its operation in accordance with the sensed state of the electricity supply to the motor 1002. While the motor 1002 is supplied with electricity, the brake unit 1030 does not operate. The brake unit 1030 thus does not produce a braking force to be imparted from the brake unit 1030 to the second accelerating unit 1200. Accordingly, the motor 1002 can set the tilt state of the rotary block (tilting portion) 1013.

Next, suppose that the braking of the rotary block (tilting portion) 1013 by the motor 1002 is stopped suddenly. This can be caused by interrupted power supply such as in a power failure or a defective transmission of the drive rotation in the speed reducing unit 1100. A possible case is that the motor 1002 is not supplied with electricity and the emergency brake system of the motor 1002 does not operate. In this case, the rotary block (tilting portion) 1013 is released from the braking from the motor 1002 side. If, for example, the work has a large weight, the rotary block (tilting portion) 1013 remaining unbraked may freely rotate about the horizontal axis F1000 under its own weight.

At the moment the motor 1002 is transferred from the energized state to the de-energized state, the rotary block (tilting portion) 1013 is transferred from the state in which it is braked or driven by the motor 1002 to the state in which it is not under such braking or driving. At this moment, the brake unit 1030 formed of the non-excitation brake switches from the state in which it does not produce a braking force to be imparted from the brake unit 1030 to the second accelerating unit 1200 to the state in which it performs the braking. The brake unit 1030 switches to the state in which it produces a braking force to be imparted from the brake unit 1030 to the second accelerating unit 1200 for the braking. With this braking force, the second output gear 1022 is braked, and the first output gear 1021 is braked. The braking force of the brake unit 1030 thus stops the rotary block (tilting portion) 1013 to fix its tilt angle if the motor 1002 is de-energized.

Another possible case is that while the motor 1002 as the driving source is supplied with electricity, the speed reducing unit 1100 does not brake or drive the rotary block (tilting portion) 1013. In this case, the rotary block (tilting portion) 1013 is released from the braking from the speed reducing unit 1100 side. If, for example, the work has a large weight, the rotary block (tilting portion) 1013 remaining unbraked may freely rotate about the horizontal axis F1000 under its own weight.

At this time, the motor 1002 remains energized. Therefore, the brake unit 1030 formed of the non-excitation brake does not naturally switch to the braking state, even when the braking state is changed such that the rotary block (tilting portion) 1013 is transferred from the state in which it is braked or driven by the speed reducing unit 1100 to the state in which it is not under such braking or driving.

To address this situation, the manufacturing apparatus (speed reducing mechanism) 1000 of the present embodiment includes a sensing device for sensing that the speed reducing unit 1100 is normally braking or driving the rotary block (tilting portion) 1013. The sensing device may be, for example, a combination of an angle sensor for sensing the rotation angle of the output portion 1211 and a sensor for sensing the drive state of the motor 1002, a combination of an angle sensor for sensing the tilt angle of the rotary block (tilting portion) 1013 and a sensor for sensing the drive state of the motor 1002, or a control unit for monitoring the output of an imaging sensor for sensing the tilt angle of the rotary block (tilting portion) 1013 and the electricity supply state of the motor 1002.

When the sensing device and the control unit determine that at least one of the energization of the motor 1002 and the retention of the tilt angle of the rotary block (tilting portion) 1013 is no longer maintained, the supply of electricity to the brake unit 1030 is stopped. Therefore, the brake unit 1030 is switched to the non-excitation state for operation. At this moment, the brake unit 1030 formed of the non-excitation brake switches from the state in which it does not produce a braking force to be imparted from the brake unit 1030 to the second accelerating unit 1200 to the state in which it performs the braking. The braking force of the brake unit 1030 thus stops the rotary block (tilting portion) 1013 to fix its tilt angle.

In the manufacturing apparatus (speed reducing mechanism) 1000 of the present embodiment, the transmission gear (spur gear) 430 and the brake gear 502 in the second accelerating unit 1200 are positioned at substantially the same plane and are meshed with each other. In this way, the brake unit 1030 is positioned to overlap the accelerating unit 1020 in the axial direction along the horizontal axis F1000. In other words, the brake unit 1030 overlaps the accelerating unit 1020 in the axial direction along the horizontal axis F1000 and is supported by the base block 1011. Accordingly, in the speed reducing mechanism 1000 of the present embodiment, the brake unit 1030 is not positioned away from the second accelerating unit 1200 in the axial direction along the horizontal axis F1000, and thus the speed reducing mechanism 1000 can be downsized in the direction along the speed reducing central axis (central axis) F1002. Since the second accelerating unit 1200 and the brake unit 1030 are provided on the base block 1011, the speed reducing mechanism 1000 of the present embodiment can be downsized and thus provides better work efficiency.

In the manufacturing apparatus (speed reducing mechanism) 1000 of the present embodiment, the rotational driving force from the motor 1002 or the tilting force (rotation) of the rotary block (tilting portion) 1013 under its own weight is transmitted by the speed reducing unit 1100 to the first output gear 1021 and the second output gear 1022 at an increased speed. Further, the tilting force (rotation) is transmitted by the second accelerating unit 1200 and the accelerating unit 1020 to the brake unit 1030 at an increased speed. Therefore, braking the tilting force (rotation) requires a smaller braking force, because the tilting force (rotation) is accelerated, or its torque is reduced, while being transmitted by the brake gear 502. Accordingly, the non-excitation brake 31 can be downsized. In the speed reducing mechanism 1000 of the present embodiment, the number of parts of the speed reducing unit 1100 can be reduced.

In the present embodiment, the second accelerating unit 1200 is configured in the same manner as the speed reducing unit 100, but this is not limitative. The second accelerating unit 1200 may have any other configuration that permits acceleration of the drive rotation. The position of the brake unit 1030 is not limited to that described above. The brake unit 1030 may be disposed at any position in the circumferential direction around the horizontal axis (speed reducing central axis) F1000 relative to the speed reducer (speed reducing unit) 1100.

The individual features of the above-described embodiments of the present invention can be selected and combined together. For example, the outer cylinder 211 (see FIGS. 1 to 4) may be braked by the brake unit 30. This can produce the same effects as the above-described embodiments.

Figure 8:
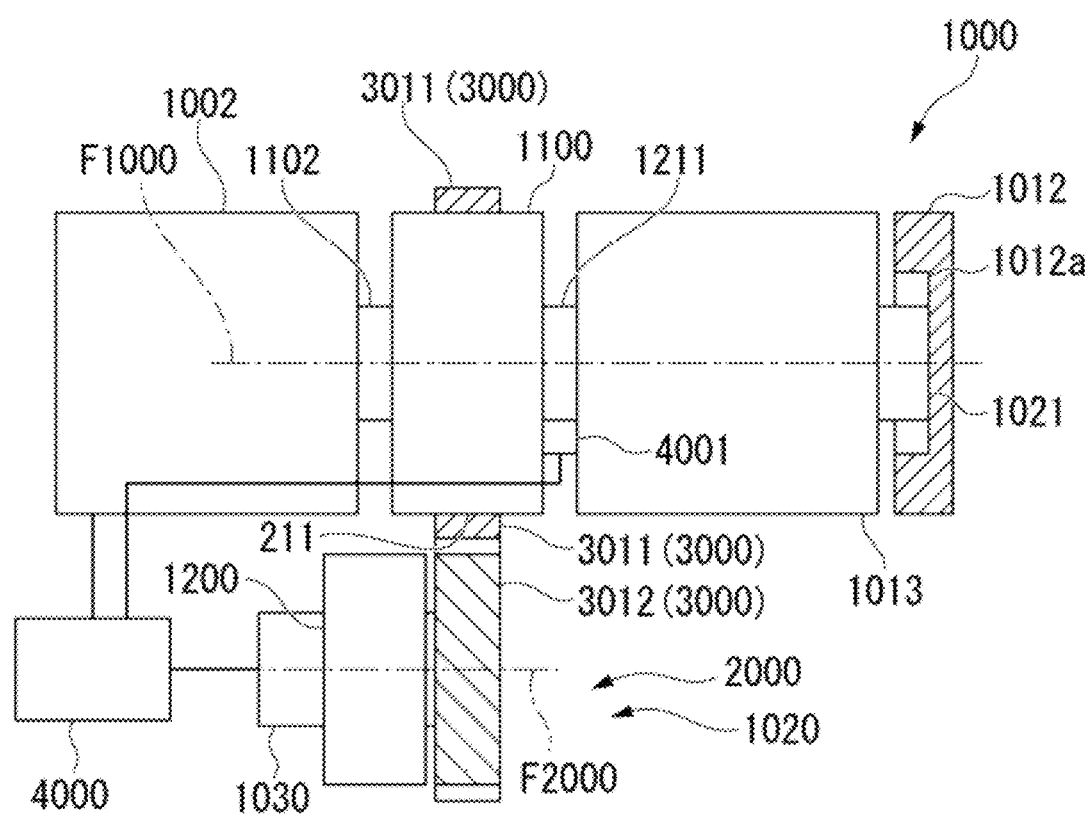
FIG. 8 is a schematic view of a fifth embodiment of a brake mechanism and the speed reducing mechanism according to the present invention.

A fifth embodiment of the brake mechanism and the speed reducing mechanism according to the invention will be hereinafter described with reference to the accompanying drawings. FIG. 8 is a schematic view of the brake mechanism and the speed reducing mechanism according to the present embodiment, shown along the axial direction. In the drawing, the reference numeral 2000 denotes the brake mechanism, and the reference numeral 1000 denotes the speed reducing mechanism. In the present embodiment, the same constituents as in the first to fourth embodiments described above are denoted by the same reference numerals and may not be described here.

The speed reducing mechanism 1000 of the present embodiment includes a tilting portion 1013, the brake mechanism 2000, and a control unit 4000. The tilting portion 1013 includes a turntable and rotates about the horizontal axis F1000, and the brake mechanism 2000 is capable of retaining the posture of the tilting portion 1013 at a predetermined rotation angle around the horizontal axis F1000.

As shown in FIG. 8, the speed reducing mechanism 1000 includes: a speed reducing unit (speed reducer) 1100 fixed on one end side in the direction of the horizontal axis F1000; a motor (rotational driving source) 1002 for outputting motive power to the speed reducer 1100; a retainer 1012 disposed on the other end side in the direction of the horizontal axis F1000; and a rotary block (tilting portion) 1013 supported at its opposite end portions in the direction of the horizontal axis F1000 by the speed reducer 1100 and the retainer 1012.

The motor 1002 is connected to the control unit 4000. The motor 1002 drives on the electric power supplied from the control unit 4000. The motor 1002 is integrally mounted to the input side of the speed reducer 1100. The speed reducer 1100 decelerates the rotation of the motor 1002 and transmits the rotation to one end side of the rotary block (tilting portion) 1013 in the direction of the horizontal axis F1000. The retainer 1012 rotatably supports the other end side of the rotary block (tilting portion) 1013 in the direction of the horizontal axis F1000.

The rotary block (tilting portion) 1013 receives the motive power from the motor 1002 via the speed reducer 1100, thereby rotating about the horizontal axis F1000 to change its tilt angle (inclination) about the horizontal axis F1000. The rotary block (tilting portion) 1013 retains its tilt angle (inclination) about the horizontal axis F1000 by the drive of the motor 1002. The rotary block (tilting portion) 1013 of the present embodiment may be, for example, a heavy load having a weight of about several metric tons.

As shown in FIG. 8, the motor 1002 is fixedly disposed on a fixed portion such as the base block. Similarly to the motor 1002, the speed reducer 1100 may be fixedly disposed on a fixed portion such as the base block. The speed reducer 1100 is disposed such that the speed reducing central axis F0 of its output is aligned with the horizontal axis F1000 of the manufacturing apparatus (speed reducing mechanism) 1000.

The speed reducer (speed reducing unit) 1100 is constituted by an eccentric oscillating speed reducer. The speed reducer (speed reducing unit) 1100 may be configured in the same manner as the speed reducing unit 100 in the first to third embodiments shown in FIGS. 1 to 5. The speed reducer (speed reducing unit) 1100 may be configured in different manners, for example, as a speed reducer including a planetary gear mechanism. In the present embodiment, it is supposed that the speed reducer (speed reducing unit) 1100 has a large reduction ratio, or a large torque ratio.

The speed reducer (speed reducing unit) 1100 includes an input shaft 1102 connected to the motor 1002. The input shaft 1102 is disposed along the horizontal axis F1000. The speed reducer 1100 includes an outer cylinder that rotates about the horizontal axis (speed reducing central axis) F1000. The speed reducer 1100 includes an output portion 1211 connected to, for example, the outer cylinder 211. The output portion 1211 rotates at the same speed as the outer cylinder 211.

The output portion 1211 in the speed reducer (speed reducing unit) 1100 outputs the drive rotation received from the motor 1002 at a reduced speed. The output portion 1211 is built integrally with the rotary block (tilting portion) 1013. The output portion 1211 rotates at the same speed as the rotary block (tilting portion) 1013. The speed reducer (speed reducing unit) 1100, the motor 1002, and the rotary block (tilting portion) 1013 rotate about the horizontal axis F1000. The horizontal axis F1000 constitutes the speed reducing central axis of the speed reducer (speed reducing unit) 1100.

The output portion 1211 and the rotary block (tilting portion) 1013 are integrated together to form a first output shaft. The first output shaft is supported at one end side of the base block (leg portion) 1011 within the speed reducing unit 1100 and is also supported by the retainer 1012 at the other end side of the base block (leg portion) 1011. The retainer 1012 includes a bearing 1012a.

The speed reducer (speed reducing unit) 1100 is connected to the brake mechanism 2000 via the rotation transmitting portion 3000. The brake mechanism 2000 applies a braking force to the speed reducer (speed reducing unit) 1100 via the rotation transmitting portion 3000 to brake the speed reducer (speed reducing unit) 1100.

The brake mechanism 2000 includes a second accelerating unit (another accelerating unit) 1200 and a brake unit 1030. The second accelerating unit (other accelerating unit) 1200 accelerates the rotation input via the rotation transmitting portion 3000, and the brake unit 1030 provides the braking force for braking the second accelerating unit (other accelerating unit) 1200. The second accelerating unit (other accelerating unit) 1200 and the speed reducer (speed reducing unit) 1100 overlap each other in the axial direction along the horizontal axis (speed reducing central axis) F1000 constituting the rotation center of the speed reducer (speed reducing unit) 1100.

As shown in FIG. 8, the brake mechanism 2000 has a brake axis F2000 parallel to the horizontal axis (speed reducing central axis) F1000. The brake axis F2000 of the brake mechanism 2000 and the horizontal axis (speed reducing central axis) F1000 are parallel to each other.

As shown in FIG. 8, the rotation transmitting portion 3000 may include a first brake output gear 3011 connected to the speed reducer (speed reducing unit) 1100 and a second brake output gear 3012 meshing with the first brake output gear 3011. The second brake output gear 3012 is connected to the second accelerating unit (other accelerating unit) 1200 of the brake mechanism 2000. The second brake output gear 3012 has a rotation axis parallel to the horizontal axis (speed reducing central axis) F1000. The rotation axis of the second brake output gear 3012 may be aligned with the brake axis F2000.

The brake mechanism 2000 may be positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100.

The first brake output gear 3011 may be connected coaxially with the outer cylinder 211 of the speed reducer (speed reducing unit) 1100. The brake mechanism 2000 applies a braking force to the speed reducer (speed reducing unit) 1100 via the rotation transmitting portion 3000 and the outer cylinder 211 to brake the speed reducer (speed reducing unit) 1100. This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The second accelerating unit (other accelerating unit) 1200 is supported by a fixed portion such as the base block. The second accelerating unit (other accelerating unit) 1200 is constituted by an eccentric oscillating speed reducer. The second accelerating unit (other accelerating unit) 1200 may be configured in different manners, for example, as a speed reducer including a planetary gear mechanism. In the present embodiment, it is supposed that the second accelerating unit (other accelerating unit) 1200 has a large speed increasing ratio (reduction ratio), or a large torque ratio. The second accelerating unit 1200 may be configured in the same manner as the speed reducing unit 100 in the first to third embodiments shown in FIGS. 1 to 5. The second accelerating unit (other accelerating unit) 1200 is connected to the brake unit 1030.

In the second accelerating unit (other accelerating unit) 1200, the second brake output gear 3012 of the rotation transmitting portion 3000 is connected to the outer cylinder 211, which is positioned on the output side of the second accelerating unit (other accelerating unit) 1200 as a speed reducer. Further, in the second accelerating unit 1200, the brake gear 502 of the brake unit 1030 is connected to the input side of the second accelerating unit 1200 as a speed reducer. When a rotational driving force is output from the second accelerating unit (other accelerating unit) 1200 to the brake gear 502, the rotational driving force is output at an increased speed. The brake gear 502 is configured as an accelerating unit 1020.

The brake unit 1030 includes the non-excitation brake 31, as does the brake unit 30 in the first to third embodiments shown in FIGS. 1 to 5. The non-excitation brake 31 of the brake unit 1030 is connected to a control unit 4000 that serves as a brake power source. The non-excitation brake 31 is not limited to a particular configuration but may be formed of any known non-excitation brake. Similarly to the second accelerating unit (other accelerating unit) 1200, the brake unit 1030 is supported by a fixed portion such as the base block.

When the supply of electricity from the control unit 4000 to the motor 1002 is stopped, the supply of electricity to the non-excitation brake 31 is stopped at the same time. Alternatively, a sensor may be provided to sense that the supply of electricity from the control unit 4000 to the motor 1002 is stopped, and in response to the output of this sensor, the supply of electricity to the non-excitation brake 31 may be stopped. Further alternatively, the brake unit 1030 may include an excitation brake and a control unit 4000 that serves as an emergency brake power source for supplying electricity to the excitation brake. In this case, when the supply of electricity from the control unit 4000 to the motor 1002 is stopped, the excitation brake may be supplied with electricity from the emergency brake power source for braking operation.

In the transmission path extending via the first brake output gear 3011 and the second brake output gear 3012 of the rotation transmitting portion 3000 and the second accelerating unit (other accelerating unit) 1200 to the brake unit 1030, the second accelerating unit (other accelerating unit) 1200 accelerates the drive rotation and transmits the accelerated drive rotation to the brake unit 1030. In other words, the rotation transmitting portion 3000 and the second accelerating unit 1200 operate as the accelerating unit 1020 in the transmission path extending from the outer cylinder 211 of the speed reducer (speed reducing unit) 1100 to the brake unit 1030.

The drive rotation is accelerated in the rotation transmitting portion 3000 and the second accelerating unit 1200. Accordingly, in the transmission path extending from the outer cylinder 211 of the speed reducer (speed reducing unit) 1100 to the brake unit 1030, the rotation transmitting portion 3000 and the second accelerating unit 1200 constitute the accelerating unit 1020. The accelerating unit 1020 accelerates the rotational drive (input rotation) from the outer cylinder 211 of the speed reducer (speed reducing unit) 1100 and transmits it to the brake unit 1030, in the speed-reducing drive transmission path within the speed reducing mechanism 1000.

In the manufacturing apparatus (speed reducing mechanism) 1000 of the present embodiment, the motor 1002 as the driving source is supplied with electric power from the control unit 4000 for driving. The motor 1002 thus drives to rotate the rotary block (tilting portion) 1013 about the horizontal axis F1000 via the speed reducing unit 1100, so as to retain a predetermined tilt angle of the rotary block (tilting portion) 1013 about the horizontal axis F1000. At this time, the drive rotation of the motor 1002 is controlled by a signal from the control unit 4000 such that the rotary block (tilting portion) 1013 is tilted about the horizontal axis F1000 to a predetermined tilt angle. The control unit 4000 controls the motor 1002 to be braked, thereby stopping the rotary block (tilting portion) 1013 to retain and fix its tilt angle.

At this time, when the drive rotation produced by the motor 1002 as the driving source is transmitted via the speed reducing unit 1100 at a reduced speed to rotate and tilt the rotary block (tilting portion) 1013, the outer cylinder 211 of the speed reducer (speed reducing unit) 1100 rotates integrally with the rotary block (tilting portion) 1013 and the output portion 1211. The rotation of the outer cylinder 211 of the speed reducer (speed reducing unit) 1100 is transmitted to the second brake output gear 3012 via the first brake output gear 3011 of the rotation transmitting portion 3000. The rotation of the second brake output gear 3012 is transmitted to the second accelerating unit (other accelerating unit) 1200 of the brake mechanism 2000. Specifically, the rotation of the outer cylinder 211 of the speed reducer (speed reducing unit) 1100 is transmitted at an increased speed to the brake unit 1030 of the brake mechanism 2000 via the rotation transmitting portion 3000 and the second accelerating unit (other accelerating unit) 1200 of the brake mechanism 2000.

While the motor 1002 as the driving source is supplied with electricity from the control unit 4000 to brake or drive the rotary block (tilting portion) 1013, the brake unit 1030 is also supplied with electricity. The brake unit 1030 operates with a non-excitation brake. Therefore, the brake unit 1030 switches its operation when supplied with electricity in association with the electricity supply from the control unit 4000 to the motor 1002. Alternatively, the brake unit 1030 switches its operation in accordance with the sensed state of the electricity supply from the control unit 4000 to the motor 1002.

The brake unit 1030 does not operate while the motor 1002 is supplied with electricity from the control unit 4000. The brake unit 1030 thus does not produce a braking force to be imparted from the brake unit 1030 to the second accelerating unit (other accelerating unit) 1200. Accordingly, the motor 1002 can set the tilt state of the rotary block (tilting portion) 1013.

Next, suppose that the braking of the rotary block (tilting portion) 1013 by the motor 1002 is stopped suddenly. This can be caused by interrupted power supply from the control unit 4000 such as in a power failure or a defective transmission of the drive rotation in the speed reducing unit 1100.

A possible case is that the electric power supply from the control unit 4000 is stopped and the motor 1002 is put into the de-energized state. In this case, the rotary block (tilting portion) 1013 is released from the braking from the motor 1002 side. If, for example, the rotary block (tilting portion) 1013 or the work supported thereon has a large weight, the rotary block (tilting portion) 1013 remaining unbraked may freely rotate about the horizontal axis F1000 under its own weight.

At the moment the motor 1002 is transferred from the energized state to the de-energized state, the rotary block (tilting portion) 1013 is transferred from the state in which it is braked or driven by the motor 1002 to the state in which it is not under such braking or driving. At this moment, the brake unit 1030 formed of the non-excitation brake switches from the state in which it does not produce a braking force to be imparted from the brake unit 1030 to the second accelerating unit (other accelerating unit) 1200 to the state in which it performs the braking. The brake unit 1030 switches to the state in which it produces a braking force to be imparted from the brake unit 1030 to the second accelerating unit (other accelerating unit) 1200 for the braking.

With this braking force, the second brake output gear 3012 of the rotation transmitting portion 3000 is braked, and the first brake output gear 3011 meshing with the second brake output gear 3012 is braked. The braking force of the brake unit 1030 thus stops the rotary block (tilting portion) 1013 to fix its tilt angle if the motor 1002 is de-energized.

Another possible case is that while the motor 1002 as the driving source is supplied with electricity from the control unit 4000, the speed reducing unit 1100 does not brake or drive the rotary block (tilting portion) 1013. In this case, the rotary block (tilting portion) 1013 is released from the braking from the speed reducing unit 1100 side. If, for example, the work has a large weight, the rotary block (tilting portion) 1013 remaining unbraked may freely rotate about the horizontal axis F1000 under its own weight.

At this time, the motor 1002 remains energized. Therefore, the brake unit 1030 formed of the non-excitation brake does not naturally switch to the braking state, even when the braking state is changed such that the rotary block (tilting portion) 1013 is transferred from the state in which it is braked or driven by the speed reducing unit 1100 to the state in which it is not under such braking or driving.

To address this situation, the manufacturing apparatus (speed reducing mechanism) 1000 of the present embodiment includes a sensing device for sensing that the speed reducing unit 1100 is normally braking or driving the rotary block (tilting portion) 1013.

One example of such a sensing device is a combination of an angle sensor 4001 for sensing the rotation angle of the output portion 1211 and a sensor for sensing the drive state of the motor 1002. The sensor for sensing the drive state of the motor 1002 may be included in the control unit 4000. Another example of the sensing device is a combination of an angle sensor for sensing the tilt angle of the rotary block (tilting portion) 1013 and a sensor for sensing the drive state of the motor 1002. Another example of the sensing device is the control unit 4000 for monitoring the output of an imaging sensor for sensing the tilt angle of the rotary block (tilting portion) 1013 and the electricity supply state of the motor 1002.

A further example of the sensing device is a combination of an angle sensor for sensing the rotation angle of the second brake output gear 3012 of the rotation transmitting portion 3000 and a sensor for sensing the drive state of the motor 1002. Another example of the sensing device is a combination of an angle sensor for sensing the rotation angle of the first brake output gear 3011 of the rotation transmitting portion 3000 and a sensor for sensing the drive state of the motor 1002. Another example of the sensing device is a combination of a sensor for sensing the rotation state of the second accelerating unit (other accelerating unit) 1200 and a sensor for sensing the drive state of the motor 1002.

When the sensing device 4001 or the like and the control unit 4000 determine that at least one of the energization of the motor 1002 and the retention of the tilt angle of the rotary block (tilting portion) 1013 is no longer maintained, the control unit 4000 stops the supply of electricity to the brake unit 1030. Therefore, the brake unit 1030 is switched to the non-excitation state for operation.

At this moment, the brake unit 1030 formed of the non-excitation brake switches from the state in which it does not produce a braking force to be imparted from the brake unit 1030 to the second accelerating unit (other accelerating unit) 1200 to the state in which it performs the braking. The braking force of the brake unit 1030 thus stops the rotary block (tilting portion) 1013 to fix its tilt angle.

In the manufacturing apparatus (speed reducing mechanism) 1000 of the present embodiment, the first brake output gear 3011 disposed on the periphery of the outer cylinder 211 of the speed reducer (speed reducing unit) 1100 and the second brake output gear 3012 are positioned at substantially the same plane and are meshed with each other. In this way, the brake unit 1030 is positioned to overlap the speed reducer (speed reducing unit) 1100 in the axial direction along the horizontal axis F1000.

In other words, the brake unit 1030 overlaps the speed reducer (speed reducing unit) 1100 in the axial direction along the horizontal axis F1000. Accordingly, in the speed reducing mechanism 1000 of the present embodiment, the brake unit 1030 is not positioned away from the speed reducer (speed reducing unit) 1100 in the axial direction along the horizontal axis F1000, and thus the speed reducing mechanism 1000 can be downsized in the direction along the speed reducing central axis (central axis) F1002.

Since the brake mechanism 2000 of the present embodiment includes the second accelerating unit (other accelerating unit) 1200 in addition to the brake unit 1030, the brake mechanism 2000 can have a sufficient braking torque. Therefore, the brake mechanism 2000 itself can be downsized.

The speed reducing mechanism 1000 of the present embodiment have added thereto the brake mechanism 2000 and the rotation transmitting portion 3000, and therefore, the speed reducing mechanism 1000 that operates as an existing positioner or the like can have an emergency stop function. Further, the speed reducing mechanism 1000 can be downsized while having the emergency stop function, and thus provides better work efficiency.

The speed reducing mechanism 1000 can be downsized while having the emergency stop function, by providing only the brake mechanism 2000 constituted by the brake unit 1030 and the second accelerating unit (other accelerating unit) 1200 and the rotation transmitting unit 3000. Therefore, a small number of parts are required for adding these components.

In the manufacturing apparatus (speed reducing mechanism) 1000 of the present embodiment, the rotational driving force from the motor 1002 or the tilting force (rotation) of the rotary block (tilting portion) 1013 under its own weight is transmitted by the speed reducing unit 1100 to the first brake output gear 3011 and the second brake output gear 3012 of the rotation transmitting portion 3000 at an increased speed. Further, the tilting force (rotation) is transmitted by the second accelerating unit (other accelerating unit) 1200 and the rotation transmitting portion 3000 to the brake unit 1030 at an increased speed.

Therefore, braking the tilting force (rotation) requires a smaller braking force, because the tilting force (rotation) is accelerated, or its torque is reduced, while being transmitted by the brake gear 502. Accordingly, the non-excitation brake 31 can be downsized. In the speed reducing mechanism 1000 of the present embodiment, the number of parts of the speed reducing unit 1100 can be reduced.

In the present embodiment, the second accelerating unit (other accelerating unit) 1200 is configured in the same manner as the speed reducing unit 100, but this is not limitative. The second accelerating unit (other accelerating unit) 1200 may have any other configuration that permits acceleration of the drive rotation.

The individual features of the above-described embodiments of the present invention can be selected and combined together.

Figure 9:
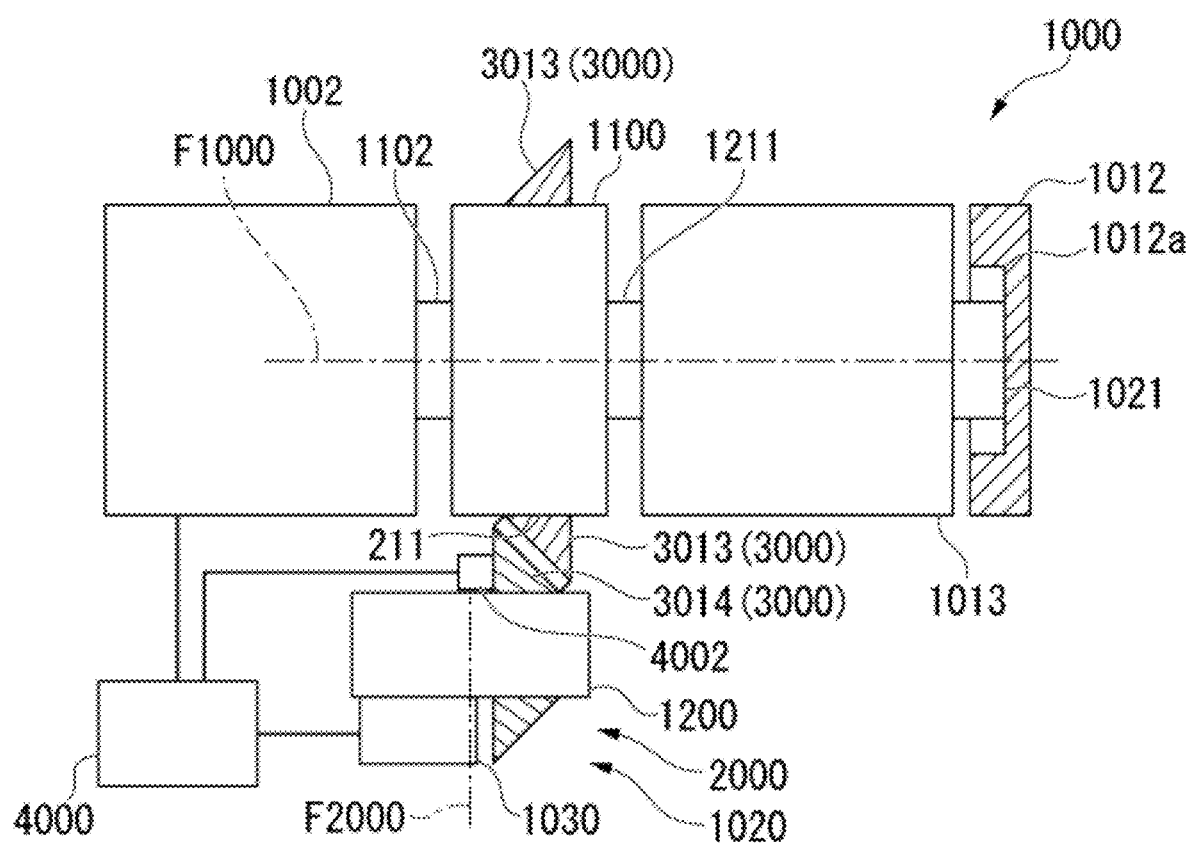
FIG. 9 is a schematic view of a sixth embodiment of the brake mechanism and the speed reducing mechanism according to the present invention.

A sixth embodiment of the brake mechanism and the speed reducing mechanism according to the invention will be hereinafter described with reference to the accompanying drawings. FIG. 9 is a schematic view of the brake mechanism and the speed reducing mechanism according to the present embodiment, shown along the axial direction. In the present embodiment, the same constituents as in the first to fifth embodiments described above are denoted by the same reference numerals and may not be described here. The present embodiment is different from the fifth embodiment described above in the arrangement of the rotation transmitting portion and the brake mechanism. Except for this difference, the present embodiment includes the same constituents as in the fifth embodiment, which are denoted by the same reference numerals and are not described here.

As shown in FIG. 9, the brake mechanism 2000 of the present embodiment has a brake axis F2000 intersecting the horizontal axis (speed reducing central axis) F1000. The brake axis F2000 of the brake mechanism 2000 and the horizontal axis (speed reducing central axis) F1000 are orthogonal to each other, for example.

As shown in FIG. 9, the rotation transmitting portion 3000 of the present embodiment may include a first brake output bevel gear 3013 connected to the speed reducer (speed reducing unit) 1100 and a second brake output bevel gear 3014 meshing with the first brake output bevel gear 3013. The second brake output bevel gear 3014 is connected to the second accelerating unit (other accelerating unit) 1200 of the brake mechanism 2000. The second brake output bevel gear 3014 has a rotation axis orthogonal to the horizontal axis (speed reducing central axis) F1000. The rotation axis of the second brake output bevel gear 3014 may be aligned with the brake axis F2000.

The brake mechanism 2000 may be positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100.

The first brake output bevel gear 3013 may be connected coaxially with the outer cylinder 211 of the speed reducer (speed reducing unit) 1100. The brake mechanism 2000 applies a braking force to the speed reducer (speed reducing unit) 1100 via the rotation transmitting portion 3000 and the outer cylinder 211 to brake the speed reducer (speed reducing unit) 1100.

This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The manufacturing apparatus (speed reducing mechanism) 1000 of the present embodiment includes the sensing device for sensing that the speed reducing unit 1100 is normally braking or driving the rotary block (tilting portion) 1013. An example of this sensing device is a combination of an angle sensor 4002 for sensing the rotation angle of the second brake output bevel gear 3014 and a sensor for sensing the drive state of the motor 1002. The sensor for sensing the drive state of the motor 1002 may be included in the control unit 4000.

When the sensing device 4002 or the like and the control unit 4000 determine that at least one of the energization of the motor 1002 and the retention of the tilt angle of the rotary block (tilting portion) 1013 is no longer maintained, the control unit 4000 stops the supply of electricity to the brake unit 1030. Therefore, the brake unit 1030 is switched to the non-excitation state for operation.

In the manufacturing apparatus (speed reducing mechanism) 1000 of the present embodiment, the first brake output bevel gear 3013 disposed on the periphery of the outer cylinder 211 of the speed reducer (speed reducing unit) 1100 and the second brake output bevel gear 3014 are meshed with each other. In this way, the brake unit 1030 is positioned to overlap the speed reducer (speed reducing unit) 1100 in the axial direction along the horizontal axis F1000. The braking force of the brake unit 1030 thus stops the rotary block (tilting portion) 1013 to fix its tilt angle.

The brake mechanism 2000 may be disposed at any such position that the first brake output bevel gear 3013 and the second brake output bevel gear 3014 mesh with each other.

This embodiment can produce the same effects as the fifth embodiment described above. Further, since the brake axis F2000 of the brake mechanism 2000 and the horizontal axis (speed reducing central axis) F1000 intersect each other, the degree of freedom of positioning the brake mechanism 2000 is increased.

Figure 10:
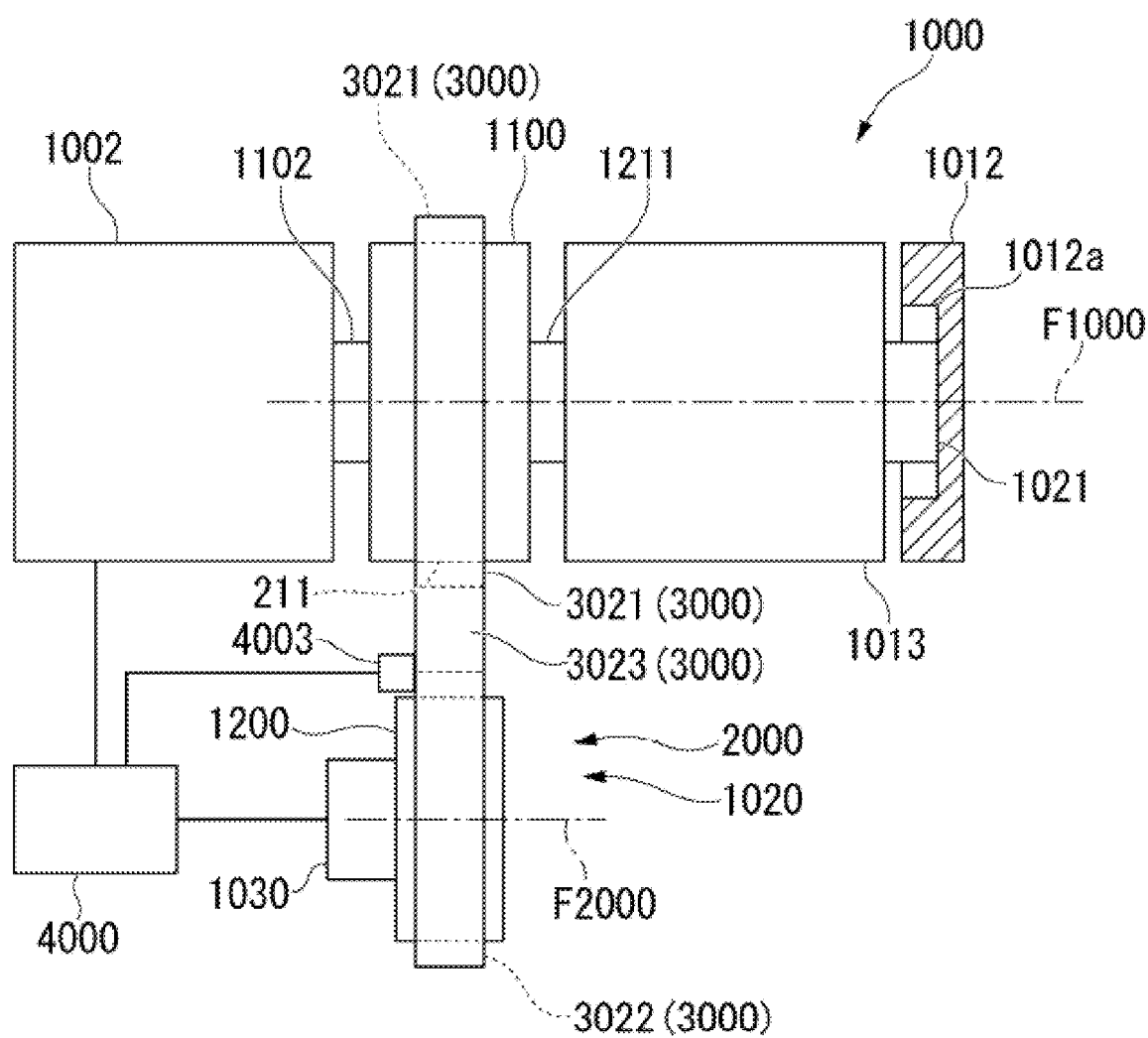
FIG. 10 is a schematic view of a seventh embodiment of the brake mechanism and the speed reducing mechanism according to the present invention.

A seventh embodiment of the brake mechanism and the speed reducing mechanism according to the invention will be hereinafter described with reference to the accompanying drawings. FIG. 10 is a schematic view of the brake mechanism and the speed reducing mechanism according to the present embodiment, shown along the axial direction. In the present embodiment, the same constituents as in the fifth and sixth embodiments described above are denoted by the same reference numerals and may not be described here. The present embodiment is different from the fifth and sixth embodiments described above in the arrangement of the rotation transmitting portion and the brake mechanism. Except for this difference, the present embodiment includes the same constituents as in the fifth and sixth embodiments, which are denoted by the same reference numerals and are not described here.

As shown in FIG. 10, the rotation transmitting portion 3000 of the present embodiment may include a first brake output pulley 3021 connected to the speed reducer (speed reducing unit) 1100 and a second brake output pulley 3022 connected via a winding belt 3023 wound around the first brake output pulley 3021. The second brake output pulley 3022 is connected to the second accelerating unit (other accelerating unit) 1200 of the brake mechanism 2000. The second brake output pulley 3022 has a rotation axis parallel to the horizontal axis (speed reducing central axis) F1000. The rotation axis of the second brake output pulley 3022 may be aligned with the brake axis F2000.

The rotation transmitting portion 3000 may include a first brake output sprocket 3021, a second brake output sprocket 3022, and a winding chain 3023 in place of the first brake output pulley 3021, the second brake output pulley 3022, and the winding belt 3023.

As shown in FIG. 10, the brake mechanism 2000 may be positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100.

The first brake output pulley 3021 may be connected coaxially with the outer cylinder 211 of the speed reducer (speed reducing unit) 1100.

The brake mechanism 2000 applies a braking force to the speed reducer (speed reducing unit) 1100 via the rotation transmitting portion 3000 and the outer cylinder 211 to brake the speed reducer (speed reducing unit) 1100. This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The manufacturing apparatus (speed reducing mechanism) 1000 of the present embodiment includes the sensing device for sensing that the speed reducing unit 1100 is normally braking or driving the rotary block (tilting portion) 1013. An example of this sensing device is a combination of a sensor 4003 for sensing the rotation angle of the second brake output pulley 3022 or the second brake output sprocket 3022 and a sensor for sensing the drive state of the motor 1002. The sensor for sensing the drive state of the motor 1002 may be included in the control unit 4000. Alternatively, the sensor 4003 may sense the winding position of the winding belt 3023 or the winding chain 3023.

When the sensing device (sensor) 4003 or the like and the control unit 4000 determine that at least one of the energization of the motor 1002 and the retention of the tilt angle of the rotary block (tilting portion) 1013 is no longer maintained, the control unit 4000 stops the supply of electricity to the brake unit 1030. Therefore, the brake unit 1030 is switched to the non-excitation state for operation.

In the manufacturing apparatus (speed reducing mechanism) 1000 of the present embodiment, the first brake output pulley 3021 disposed on the periphery of the outer cylinder 211 of the speed reducer (speed reducing unit) 1100 and the second brake output pulley 3022 are rotated synchronously with each other via the winding belt 2023. In this way, the brake unit 1030 is positioned to overlap the speed reducer (speed reducing unit) 1100 in the axial direction along the horizontal axis F1000. The braking force of the brake unit 1030 thus stops the rotary block (tilting portion) 1013 to fix its tilt angle.

The brake mechanism 2000 may be disposed at any such position that the first brake output pulley 3021 and the second brake output pulley 3022 are synchronized with each other via the winding belt 2023, irrespective of the distance therebetween.

This embodiment can produce the same effects as the fifth and sixth embodiments described above. Further, since the brake axis F2000 of the brake mechanism 2000 and the horizontal axis (speed reducing central axis) F1000 can be spaced apart from each other, the degree of freedom of positioning the brake mechanism 2000 is increased.

Figure 11:
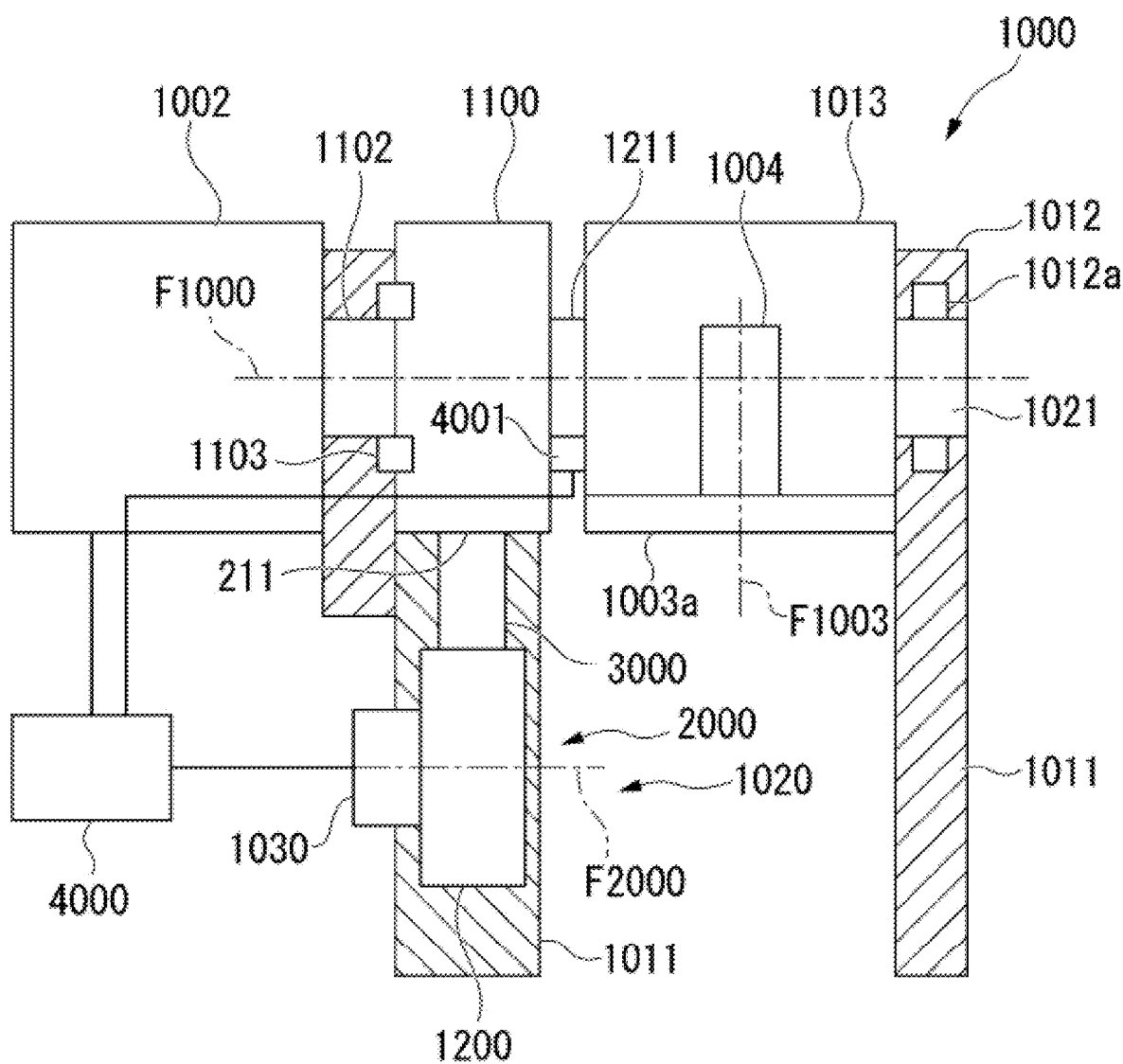
FIG. 11 is a schematic view of an eighth embodiment of the brake mechanism and the speed reducing mechanism according to the present invention.

An eighth embodiment of the brake mechanism and the speed reducing mechanism according to the invention will be hereinafter described with reference to the accompanying drawings. FIG. 11 is a schematic view of the brake mechanism and the speed reducing mechanism according to the present embodiment, shown along the axial direction. In the drawing, the reference numeral 2000 denotes the brake mechanism, and the reference numeral 1000 denotes the speed reducing mechanism. In the present embodiment, the same constituents as in the first to seventh embodiments described above are denoted by the same reference numerals and may not be described here.

The speed reducing mechanism 1000 of the present embodiment includes the tilting portion 1013, the brake mechanism 2000, and the control unit 4000. The tilting portion 1013 includes a turntable and rotates about the horizontal axis F1000, and the brake mechanism 2000 is capable of retaining the posture of the tilting portion 1013 at a predetermined rotation angle around the horizontal axis F1000.

A manufacturing apparatus (speed reducing mechanism) 1000 is used for performing cutting, grinding and other processes, welding, assembling and the like on a work placed on the turntable 1003. The turntable 1003 rotates about a table axis F1003, and the table axis F1003 in turn rotates about a horizontal axis F1000.

As shown in FIG. 11, the speed reducing mechanism 1000 includes: a speed reducing unit (speed reducer) 1100 fixed on one end side in the direction of the horizontal axis F1000; a motor (rotational driving source) 1002 for outputting motive power to the speed reducer 1100; a retainer 1012 disposed on the other end side in the direction of the horizontal axis F1000; and a rotary block (tilting portion) 1013 supported at its opposite end portions in the direction of the horizontal axis F1000 by the speed reducer 1100 and the retainer 1012.

The motor 1002 is integrally mounted to the input side of the speed reducer 1100. The speed reducer 1100 decelerates the rotation of the motor 1002 and transmits the rotation to one end side of the rotary block (tilting portion) 1013 in the direction of the horizontal axis F1000. The retainer 1012 rotatably supports the other end side of the rotary block (tilting portion) 1013 in the direction of the horizontal axis F1000. The rotary block (tilting portion) 1013 receives the motive power from the motor 1002 via the speed reducer 1100 to rotate about the horizontal axis F1000.

The rotary block (tilting portion) 1013 includes the turntable 1003 that rotates about the horizontal axis F1000. The turntable 1003 has a work supporting surface 1003a. A work is mounted on the work supporting surface 1003a of the turntable 1003.

The rotary block (tilting portion) 1013 tilts and rotates about the horizontal axis F1000 by the rotation of the motor 1002. The work mounted on the work supporting surface 1003a of the turntable 1003 is moved toward a working position by the rotation of the rotary block (tilting portion) 1013 caused by the motor 1002. The rotary block (tilting portion) 1013 of the present embodiment with the work mounted thereon may be, for example, a heavy load having a weight of about several metric tons.

The rotary block (tilting portion) 1013 also includes a table driving motor 1004 for rotating the turntable 1003 about the table axis F1003 that is orthogonal to the horizontal axis F1000. The turntable 1003 tilted about the horizontal axis F1000 is rotated about the table axis F1003 by the table driving motor 1004. The work mounted on the work supporting surface 1003a of the turntable 1003 is rotated at the working position by the rotation of the turntable 1003 caused by the table driving motor 1004.

At the working position, there may be installed a working device such as an assembling robot or a welding robot. FIG. 11 shows that the work supporting surface 1003a of the turntable 1003 faces downward.

The speed reducer 1100 is fixed at its lower end to the upper surface of the base block (leg portion) 1011 on the one end side. The speed reducer 1100 is disposed on the base block (leg portion) 1011 such that the speed reducing central axis F0 of its output is aligned with the horizontal axis F1000 of the manufacturing apparatus (speed reducing mechanism) 1000. The speed reducer (speed reducing unit) 1100 is constituted by an eccentric oscillating speed reducer. The speed reducer (speed reducing unit) 1100 may be configured in the same manner as the speed reducing unit 100 in the first to third embodiments shown in FIGS. 1 to 5. The speed reducer (speed reducing unit) 1100 may be configured in different manners, for example, as a speed reducer including a planetary gear mechanism. In the present embodiment, it is supposed that the speed reducer (speed reducing unit) 1100 has a large reduction ratio, or a large torque ratio.

The speed reducer (speed reducing unit) 1100 includes an input shaft 1102 connected to the motor 1002. The input shaft 1102 is disposed along the horizontal axis F1000. The input shaft 1102 is supported by a bearing 1103. The bearing 1103 is fixed to the base block (leg portion) 1011. The speed reducer 1100 includes an outer cylinder 211 that rotates about the horizontal axis (speed reducing central axis) F1000. The speed reducer 1100 includes an output portion 1211 connected to, for example, the outer cylinder 211. The output portion 1211 rotates at the same speed as the outer cylinder 211.

The output portion 1211 in the speed reducer (speed reducing unit) 1100 outputs the drive rotation received from the motor 1002 at a reduced speed. The output portion 1211 is built integrally with the rotary block (tilting portion) 1013. The output portion 1211 rotates at the same speed as the rotary block (tilting portion) 1013. The speed reducer (speed reducing unit) 1100, the motor 1002, and the rotary block (tilting portion) 1013 rotate about the horizontal axis F1000. The horizontal axis F1000 constitutes the speed reducing central axis of the speed reducer (speed reducing unit) 1100.

The output portion 1211 and the rotary block (tilting portion) 1013 are integrated together to form a first output shaft. The first output shaft is supported at one end side of the base block (leg portion) 1011 within the speed reducing unit 1100 and is also supported by the retainer 1012 at the other end side of the base block (leg portion) 1011. The retainer 1012 is positioned on the upper portion of the base block (leg portion) 1011 and includes a bearing 1012a.

The speed reducer (speed reducing unit) 1100 is connected to the brake mechanism 2000 via the rotation transmitting portion 3000. The brake mechanism 2000 applies a braking force to the speed reducer (speed reducing unit) 1100 via the rotation transmitting portion 3000 to brake the speed reducer (speed reducing unit) 1100.

The brake mechanism 2000 is supported by the base block (leg portion) 1011. The brake mechanism 2000 includes a second accelerating unit (another accelerating unit) 1200 and a brake unit 1030. The second accelerating unit (other accelerating unit) 1200 accelerates the rotation input via the rotation transmitting portion 3000, and the brake unit 1030 provides the braking force for braking the second accelerating unit (other accelerating unit) 1200. The second accelerating unit (other accelerating unit) 1200 and the speed reducer (speed reducing unit) 1100 overlap each other in the axial direction along the horizontal axis (speed reducing central axis) F1000 constituting the rotation center of the speed reducer (speed reducing unit) 1100.

As shown in FIG. 11, the brake mechanism 2000 has a brake axis F2000 parallel to the horizontal axis (speed reducing central axis) F1000. The brake axis F2000 of the brake mechanism 2000 and the horizontal axis (speed reducing central axis) F1000 are parallel to each other.

As shown in FIG. 11, the rotation transmitting portion 3000 is connected to the outer cylinder 211 of the speed reducer (speed reducing unit) 1100 and the second accelerating unit (other accelerating unit) 1200. As in the fifth embodiment, the rotation transmitting portion 3000 may include a first brake output gear 3011 connected coaxially with the outer cylinder 211 of the speed reducer (speed reducing unit) 1100 and a second brake output gear 3012.

Alternatively, as in the seventh embodiment, the rotation transmitting portion 3000 may include a first brake output pulley 3021 connected coaxially with the outer cylinder 211 of the speed reducer (speed reducing unit) 1100, a second brake output pulley 3022, and a winding belt 3023. Further alternatively, as in the seventh embodiment, the rotation transmitting portion 3000 may include a first brake output sprocket 3021 connected coaxially with the outer cylinder 211 of the speed reducer (speed reducing unit) 1100, a second brake output sprocket 3022, and a winding chain 3023.

In addition, as in the sixth embodiment, the rotation transmitting portion 3000 may include a first brake output bevel gear 3013 connected coaxially with the outer cylinder 211 of the speed reducer (speed reducing unit) 1100 and a second brake output bevel gear 3014. In this case, the brake axis F2000 of the brake mechanism 2000 intersects the horizontal axis (speed reducing central axis) F1000.

The brake mechanism 2000 may be positioned to be supported by a portion of the base block (leg portion) 1011 that is positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100, and the brake mechanism 2000 may be supported by the base block (leg portion) 1011.

The brake mechanism 2000 applies a braking force to the speed reducer (speed reducing unit) 1100 via the rotation transmitting portion 3000 and the outer cylinder 211 to brake the speed reducer (speed reducing unit) 1100. This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The second accelerating unit (other accelerating unit) 1200 is supported by the base block (leg portion) 1011. The second accelerating unit (other accelerating unit) 1200 is constituted by an eccentric oscillating speed reducer. The second accelerating unit (other accelerating unit) 1200 may be configured in different manners, for example, as a speed reducer including a planetary gear mechanism. In the present embodiment, it is supposed that the second accelerating unit (other accelerating unit) 1200 has a large speed increasing ratio (reduction ratio), or a large torque ratio. The second accelerating unit 1200 may be configured in the same manner as the speed reducing unit 100 in the first to third embodiments shown in FIGS. 1 to 5. The second accelerating unit (other accelerating unit) 1200 is connected to the brake unit 1030.

In the second accelerating unit (other accelerating unit) 1200, the second brake output gear 3012 of the rotation transmitting portion 3000 is connected to the outer cylinder 211, which is positioned on the output side of the second accelerating unit (other accelerating unit) 1200 as a speed reducer, that is, the input side of the same as a speed-increasing gear. Further, in the second accelerating unit 1200, the brake gear 502 of the brake unit 1030 is connected to the center gear 500, which is positioned on the input side of the second accelerating unit 1200 as a speed reducer, that is, the output side of the same as a speed-increasing gear. When a rotational driving force is output from the second accelerating unit (other accelerating unit) 1200 to the brake gear 502, the rotational driving force is output at an increased speed. The brake gear 502 is configured as an accelerating unit 1020.

The brake unit 1030 includes the non-excitation brake 31, as does the brake unit 30 in the first to third embodiments shown in FIGS. 1 to 5. The non-excitation brake 31 of the brake unit 1030 is connected to a control unit 4000 that serves as a brake power source. The non-excitation brake 31 is not limited to a particular configuration but may be formed of any known non-excitation brake. Similarly to the second accelerating unit (other accelerating unit) 1200, the brake unit 1030 is supported by the base block (leg portion) 1011.

When the supply of electricity from the control unit 4000 to the motor 1002 is stopped, the supply of electricity to the non-excitation brake 31 is stopped at the same time. Alternatively, a sensor may be provided to sense that the supply of electricity from the control unit 4000 to the motor 1002 is stopped, and in response to the output of this sensor, the supply of electricity to the non-excitation brake 31 may be stopped.

Further alternatively, the brake unit 1030 may include an excitation brake and a control unit 4000 that serves as an emergency brake power source for supplying electricity to the excitation brake. In this case, when the supply of electricity from the control unit 4000 to the motor 1002 is stopped, the excitation brake may be supplied with electricity from the emergency brake power source for braking operation.

In the transmission path extending via the rotation transmitting portion 3000 and the second accelerating unit (other accelerating unit) 1200 to the brake unit 1030, the second accelerating unit (other accelerating unit) 1200 accelerates the drive rotation and transmits the accelerated drive rotation to the brake unit 1030. In other words, the rotation transmitting portion 3000 and the second accelerating unit 1200 operate as the accelerating unit 1020 in the transmission path extending from the outer cylinder 211 of the speed reducer (speed reducing unit) 1100 to the brake unit 1030 of the brake mechanism 2000.

The drive rotation is accelerated in the rotation transmitting portion 3000 and the second accelerating unit 1200. Accordingly, in the transmission path extending from the outer cylinder 211 of the speed reducer (speed reducing unit) 1100 to the brake unit 1030, the rotation transmitting portion 3000 and the second accelerating unit 1200 constitute the accelerating unit 1020. The accelerating unit 1020 accelerates the rotational drive (input rotation) from the outer cylinder 211 of the speed reducer (speed reducing unit) 1100 and transmits it to the brake unit 1030, in the speed-reducing drive transmission path within the speed reducing mechanism 1000.

In the manufacturing apparatus (speed reducing mechanism) 1000 of the present embodiment, the rotary block (tilting portion) 1013 is supported at its opposite ends by the bearing 1012*a* and the speed reducer 1100. The input shaft 1102 is supported by the bearing 1103. Therefore, the rotary block (tilting portion) 1013 is supported by the bearing 1103 and the bearing 1012*a*. In this way, in the manufacturing apparatus (speed reducing mechanism) 1000, the rotary block (tilting portion) 1013 serving as a positioner is supported by the bearing 1103 and the bearing 1012*a* as if it forms a multistage rotatable shaft along with the input shaft 1102, the speed reducer 1100, and the output portion 1211. This arrangement requires a smaller number of parts to support the rotary block (tilting portion) 1013.

In the manufacturing apparatus (speed reducing mechanism) 1000 of the present embodiment, the motor 1002 as the driving source is supplied with electric power from the control unit 4000 for driving. The motor 1002 thus drives to rotate the rotary block (tilting portion) 1013 about the horizontal axis F1000 via the speed reducing unit 1100, so as to retain a predetermined tilt angle of the rotary block (tilting portion) 1013 about the horizontal axis F1000.

At this time, the drive rotation of the motor 1002 is controlled by a signal from the control unit 4000 such that the rotary block (tilting portion) 1013 is tilted about the horizontal axis F1000 to a predetermined tilt angle. The control unit 4000 controls the motor 1002 to be braked, thereby stopping the rotary block (tilting portion) 1013 to retain and fix its tilt angle.

At this time, when the drive rotation produced by the motor 1002 as the driving source is transmitted via the speed reducing unit 1100 at a reduced speed to rotate and tilt the rotary block (tilting portion) 1013, the outer cylinder 211 of the speed reducer (speed reducing unit) 1100 rotates integrally with the rotary block (tilting portion) 1013 and the output portion 1211.

The rotation of the outer cylinder 211 of the speed reducer (speed reducing unit) 1100 is transmitted to the second accelerating unit (other accelerating unit) 1200 of the brake mechanism 2000 via the rotation transmitting portion 3000. Specifically, the rotation of the outer cylinder 211 of the speed reducer (speed reducing unit) 1100 is transmitted at an increased speed to the brake unit 1030 of the brake mechanism 2000 via the rotation transmitting portion 3000 and the second accelerating unit (other accelerating unit) 1200 of the brake mechanism 2000.

While the motor 1002 as the driving source is supplied with electricity from the control unit 4000 to brake or drive the rotary block (tilting portion) 1013, the brake unit 1030 is also supplied with electricity. The brake unit 1030 operates with a non-excitation brake. Therefore, the brake unit 1030 switches its operation when supplied with electricity in association with the electricity supply from the control unit 4000 to the motor 1002. Alternatively, the brake unit 1030 switches its operation in accordance with the sensed state of the electricity supply from the control unit 4000 to the motor 1002.

The brake unit 1030 does not operate while the motor 1002 is supplied with electricity from the control unit 4000. The brake unit 1030 thus does not produce a braking force to be imparted from the brake unit 1030 to the second accelerating unit (other accelerating unit) 1200. Accordingly, the motor 1002 can set the tilt state of the rotary block (tilting portion) 1013.

Next, suppose that the braking of the rotary block (tilting portion) 1013 by the motor 1002 is stopped suddenly. This can be caused by interrupted power supply from the control unit 4000 such as in a power failure or a defective transmission of the drive rotation in the speed reducing unit 1100.

A possible case is that the electric power supply from the control unit 4000 is stopped and the motor 1002 is put into the de-energized state. In this case, the rotary block (tilting portion) 1013 is released from the braking from the motor 1002 side. If, for example, the rotary block (tilting portion) 1013 or the work supported thereon has a large weight, the rotary block (tilting portion) 1013 remaining unbraked may freely rotate about the horizontal axis F1000 under its own weight.

At the moment the motor 1002 is transferred from the energized state to the de-energized state, the rotary block (tilting portion) 1013 is transferred from the state in which it is braked or driven by the motor 1002 to the state in which it is not under such braking or driving. At this moment, the brake unit 1030 formed of the non-excitation brake switches from the state in which it does not produce a braking force to be imparted from the brake unit 1030 to the second accelerating unit (other accelerating unit) 1200 to the state in which it performs the braking. The brake unit 1030 switches to the state in which it produces a braking force to be imparted to the second accelerating unit (other accelerating unit) 1200 for the braking.

Therefore, the rotation of the outer cylinder 211 of the speed reducer (speed reducing unit) 1100 is braked via the second accelerating unit (other accelerating unit) 1200 and the rotation transmitting portion 3000. In this way, if the motor 1002 is de-energized, the braking force of the brake unit 1030 stops the rotary block (tilting portion) 1013 integrated with the outer cylinder 211, to fix the tilt angle of the rotary block (tilting portion) 1013.

Another possible case is that while the motor 1002 as the driving source is supplied with electricity from the control unit 4000, the speed reducing unit 1100 does not brake or drive the rotary block (tilting portion) 1013. In this case, the rotary block (tilting portion) 1013 is released from the braking from the speed reducing unit 1100 side. If, for example, the work has a large weight, the rotary block (tilting portion) 1013 remaining unbraked may freely rotate about the horizontal axis F1000 under its own weight.

At this time, the motor 1002 remains energized. Therefore, the brake unit 1030 formed of the non-excitation brake does not naturally switch to the braking state, even when the braking state is changed such that the rotary block (tilting portion) 1013 is transferred from the state in which it is braked or driven by the speed reducing unit 1100 to the state in which it is not under such braking or driving.

To address this situation, the manufacturing apparatus (speed reducing mechanism) 1000 of the present embodiment includes a sensing device for sensing that the speed reducing unit 1100 is normally braking or driving the rotary block (tilting portion) 1013.

One example of such a sensing device is a combination of an angle sensor 4001 for sensing the rotation angle of the output portion 1211 and a sensor for sensing the drive state of the motor 1002. The sensor for sensing the drive state of the motor 1002 may be included in the control unit 4000. The sensing device may be configured in difference manners.

When the angle sensor 4001 as the sensing device and the control unit 4000 determine that at least one of the energization of the motor 1002 and the retention of the tilt angle of the rotary block (tilting portion) 1013 is no longer maintained, the control unit 4000 stops the supply of electricity to the brake unit 1030. Therefore, the brake unit 1030 is switched to the non-excitation state for operation.

At this moment, the brake unit 1030 formed of the non-excitation brake switches from the state in which it does not produce a braking force to be imparted from the brake unit 1030 to the second accelerating unit (other accelerating unit) 1200 to the state in which it performs the braking. The braking force of the brake unit 1030 thus stops the rotary block (tilting portion) 1013 to fix its tilt angle.

In the manufacturing apparatus (speed reducing mechanism) 1000 of the present embodiment, the speed reducer (speed reducing unit) 1100, the rotation transmitting portion 3000, and the brake mechanism 2000 are positioned to include substantially the same plane orthogonal to the horizontal axis F1000 and are meshed with each other. In this way, the brake unit 1030 is positioned to overlap the speed reducer (speed reducing unit) 1100 in the axial direction along the horizontal axis F1000.

In the manufacturing apparatus (speed reducing mechanism) 1000 of the present embodiment, the speed reducer (speed reducing unit) 1100, the rotation transmitting portion 3000, and the brake mechanism 2000 overlap each other in the axial direction along the horizontal axis F1000 and are supported by the base block (leg portion) 1011.

Accordingly, the speed reducing mechanism 1000 of the present embodiment can be downsized in the direction along the speed reducing central axis (central axis) F1002. In the speed reducing mechanism 1000 of the present embodiment, the speed reducer (speed reducing unit) 1100, the rotation transmitting portion 3000, and the brake mechanism 2000 are disposed at the same side of the base block (leg portion) 1011 in the direction along the speed reducing central axis (central axis) F1002, and therefore, the speed reducing mechanism 1000 can be downsized. Further, it is not necessary to provide a cover or the like in the vicinity of the retainer 1012, which is disposed at the other side of the base block (leg portion) 1011 in the direction along the horizontal axis F1000, and therefore, the number of parts can be reduced.

The speed reducing mechanism 1000 of the present embodiment have added thereto the brake mechanism 2000 and the rotation transmitting portion 3000, and therefore, the speed reducing mechanism 1000 that operates as an existing positioner or the like can have an emergency stop function. Further, the speed reducing mechanism 1000 can be downsized while having the emergency stop function, and thus provides better work efficiency.

Figure 12:
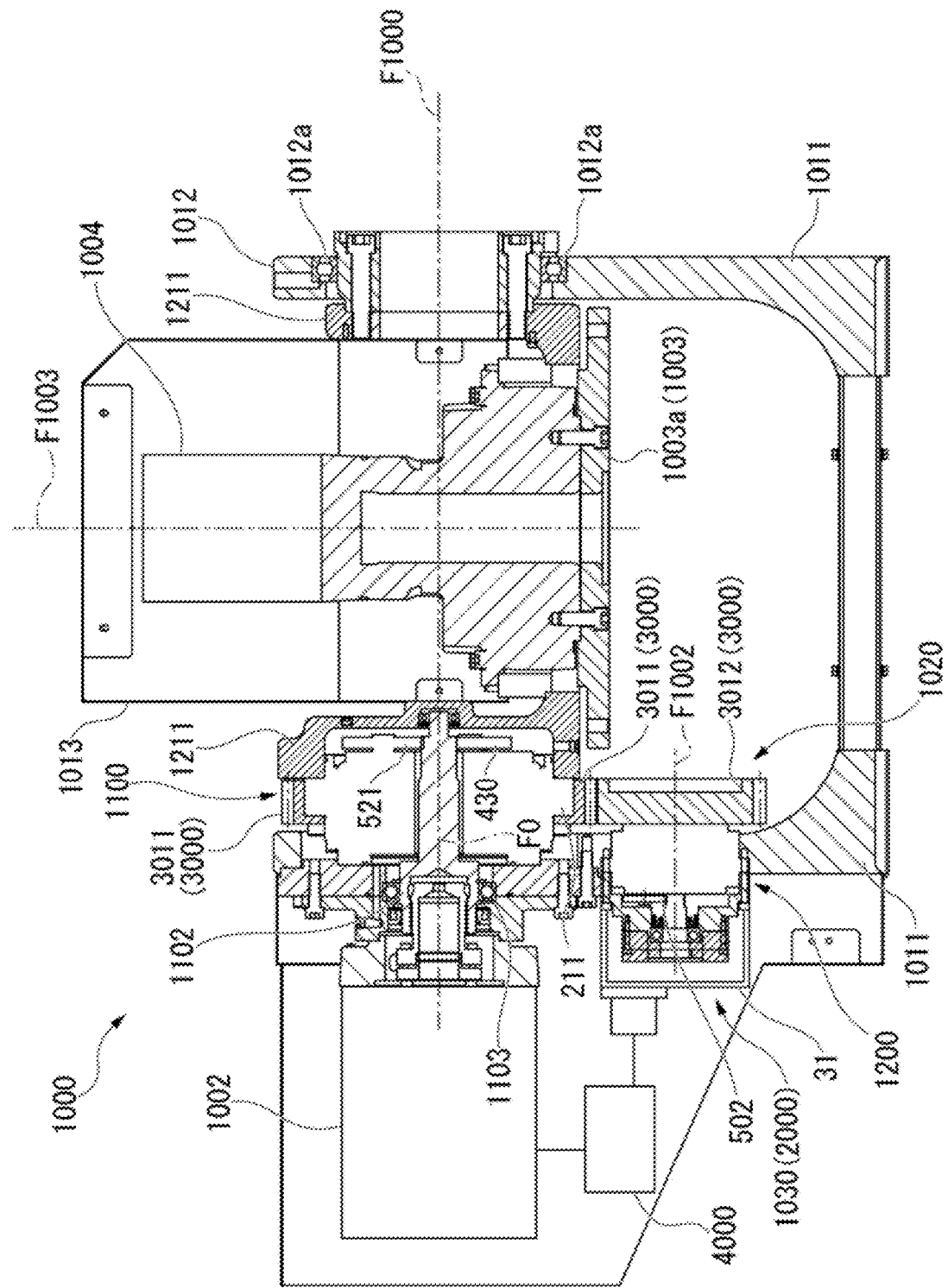
FIG. 12 is a sectional view of a ninth embodiment of the brake mechanism and the speed reducing mechanism according to the present invention, shown along the axial direction.
Figure 13:
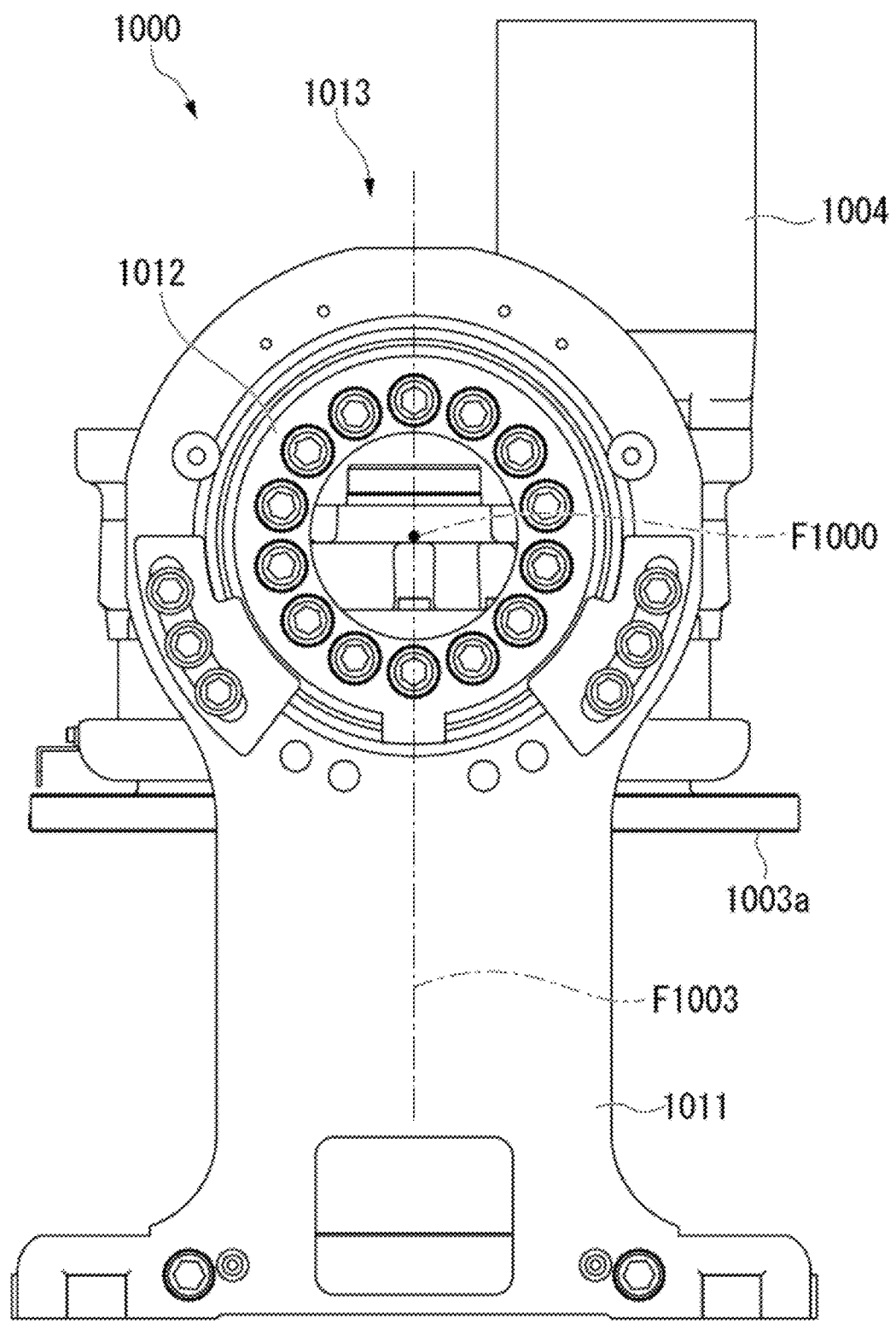
FIG. 13 is a side view of the ninth embodiment of the brake mechanism and the speed reducing mechanism according to the present invention, as viewed in the axial direction.

A ninth embodiment of the brake mechanism and the speed reducing mechanism according to the invention will be hereinafter described with reference to the accompanying drawings. FIG. 12 is a schematic view of the brake mechanism and the speed reducing mechanism according to the present embodiment, shown along the axial direction. FIG. 13 is a schematic side view of the speed reducing mechanism according to the present embodiment, as seen in the axial direction. In the drawing, the reference numeral 2000 denotes the brake mechanism, and the reference numeral 1000 denotes the speed reducing mechanism. For the present embodiment, the same constituents as in the first to eighth embodiments described above are denoted by the same reference numerals and may not be described here.

The speed reducing mechanism 1000 of the present embodiment includes the tilting portion 1013, the brake mechanism 2000, and the control unit 4000. The tilting portion 1013 includes a turntable and rotates about the horizontal axis F1000, and the brake mechanism 2000 is capable of retaining the posture of the tilting portion 1013 at a predetermined rotation angle around the horizontal axis F1000.

A manufacturing apparatus (speed reducing mechanism) 1000 is used for performing cutting, grinding and other processes, welding, assembling and the like on a work placed on the turntable 1003. The turntable 1003 rotates about a table axis F1003, and the table axis F1003 in turn rotates about a horizontal axis F1000.

As shown in FIGS. 12 and 13, the manufacturing apparatus (speed reducing mechanism) 1000 includes: a base block (leg portion) placed on a floor surface; a speed reducing unit (speed reducer) 1100 fixed to an upper surface of the base block (leg portion) 1011 on one end side in the direction of the horizontal axis F1000; a motor (rotational driving source) 1002 for outputting motive power to the speed reducer 1100; a retainer 1012 fixed to the upper surface of the base block (leg portion) 1011 on the other end side in the direction of the horizontal axis F1000; and a rotary block (tilting portion) 1013 supported at its opposite end portions in the direction of the horizontal axis F1000 by the speed reducer 1100 and the retainer 1012.

The base block (leg portion) 1011 stands vertically on each of the opposite sides of the rotary block (tilting portion) 1013 along the direction of the horizontal axis F1000, so as to support the rotary block (tilting portion) 1013. The base block (leg portion) 1011 is constituted by plate-shaped portions each being substantially orthogonal to the direction of the horizontal axis F1000.

The motor 1002 is integrally mounted to the input side of the speed reducer 1100. The speed reducer 1100 decelerates the rotation of the motor 1002 and transmits the rotation to one end side of the rotary block (tilting portion) 1013 in the direction of the horizontal axis F1000. The motor 1002 is mounted to the upper portion of the base block (leg portion) 1011 on the side which is closer to the speed reducer 1100 than to the rotary block (tilting portion) 1013 in the direction of the horizontal axis F1000. The retainer 1012 rotatably supports the other end side of the rotary block (tilting portion) 1013 in the direction of the horizontal axis F1000. The rotary block (tilting portion) 1013 receives the motive power from the motor 1002 via the speed reducer 1100 to rotate about the horizontal axis F1000.

The rotary block (tilting portion) 1013 includes the turntable 1003 that rotates about the horizontal axis F1000. The turntable 1003 has a work supporting surface 1003*a*. A work is mounted on the work supporting surface 1003*a* of the turntable 1003.

The rotary block (tilting portion) 1013 tilts and rotates about the horizontal axis F1000 by the rotation of the motor 1002. The work mounted on the work supporting surface 1003a of the turntable 1003 is moved toward a working position by the rotation of the rotary block (tilting portion) 1013 caused by the motor 1002. The rotary block (tilting portion) 1013 of the present embodiment with the work mounted thereon may be, for example, a heavy load having a weight of about several metric tons.

The rotary block (tilting portion) 1013 also includes a table driving motor 1004 for rotating the turntable 1003 about the table axis F1003 that is orthogonal to the horizontal axis F1000. In the rotary block (tilting portion) 1013, the turntable 1003 tilted about the horizontal axis F1000 is rotated about the table axis F1003 by the table driving motor 1004. The work mounted on the work supporting surface 1003a of the turntable 1003 is rotated at the working position by the rotation of the turntable 1003 caused by the table driving motor 1004. In other words, the turntable 1003 is a positioner capable of position control about the two axes, the horizontal axis F1000 and the table axis F1003. At the working position, there may be installed a working device such as a welding robot. FIGS. 12 and 13 show that the work supporting surface 1003a of the turntable 1003 faces downward.

The speed reducer 1100 is fixed at its lower end to the upper surface of the base block (leg portion) 1011 on the one end side. The speed reducer 1100 is disposed on the base block (leg portion) 1011 such that the speed reducing central axis F0 of its output is aligned with the horizontal axis F1000 of the manufacturing apparatus (speed reducing mechanism) 1000. The speed reducer (speed reducing unit) 1100 is constituted by an eccentric oscillating speed reducer. The speed reducer (speed reducing unit) 1100 may be configured in the same manner as the speed reducing unit 100 in the first to third embodiments shown in FIGS. 1 to 5. The speed reducer (speed reducing unit) 1100 may be configured in different manners, for example, as a speed reducer including a planetary gear mechanism. In the present embodiment, it is supposed that the speed reducer (speed reducing unit) 1100 has a large reduction ratio, or a large torque ratio.

The speed reducer (speed reducing unit) 1100 includes an input shaft 1102 connected to the motor 1002. The input shaft 1102 is disposed along the horizontal axis F1000. The input shaft 1102 is supported by a bearing 1103. The bearing 1103 is fixed to the base block (leg portion) 1011. The speed reducer 1100 includes an outer cylinder 211 that rotates about the horizontal axis (speed reducing central axis) F1000. The speed reducer 1100 includes an output portion 1211 connected to the rotary block (tilting portion) 1013 side of the outer cylinder 211. The output portion 1211 rotates at the same speed as the outer cylinder 211.

The output portion 1211 in the speed reducer (speed reducing unit) 1100 outputs the drive rotation received from the motor 1002 at a reduced speed. The output portion 1211 is built integrally with the rotary block (tilting portion) 1013. The output portion 1211 rotates at the same speed as the rotary block (tilting portion) 1013. The speed reducer (speed reducing unit) 1100, the motor 1002, and the rotary block (tilting portion) 1013 rotate about the horizontal axis F1000. The horizontal axis F1000 constitutes the speed reducing central axis of the speed reducer (speed reducing unit) 1100.

The output portion 1211 and the rotary block (tilting portion) 1013 are integrated together to form a first output shaft. The first output shaft is supported by the bearing 1103 along with the input shaft 1102 at one end side of the base block (leg portion) 1011 within the speed reducing unit 1100. The first output shaft is also supported by the retainer 1012 at the other end side of the base block (leg portion) 1011. The retainer 1012 is positioned on the upper portion of the base block (leg portion) 1011 and includes a bearing 1012a. The rotation axis of the first output shaft is aligned with the horizontal axis F1000.

The speed reducer (speed reducing unit) 1100 is connected to the brake mechanism 2000 via the rotation transmitting portion 3000. The brake mechanism 2000 applies a braking force to the speed reducer (speed reducing unit) 1100 via the rotation transmitting portion 3000 to brake the speed reducer (speed reducing unit) 1100.

As shown in FIG. 12, the brake mechanism 2000 is supported by the base block (leg portion) 1011. The brake mechanism 2000 penetrates, in the direction along the horizontal axis F1000, the portion of the base block (leg portion) 1011 positioned immediately under the speed reducer (speed reducing unit) 1100. The brake mechanism 2000 includes a second accelerating unit (another accelerating unit) 1200 and a brake unit 1030. The second accelerating unit (other accelerating unit) 1200 accelerates the rotation input via the rotation transmitting portion 3000, and the brake unit 1030 provides the braking force for braking the second accelerating unit (other accelerating unit) 1200.

The second accelerating unit (other accelerating unit) 1200 and the speed reducer (speed reducing unit) 1100 overlap each other in the axial direction along the horizontal axis (speed reducing central axis) F1000 constituting the rotation center of the speed reducer (speed reducing unit) 1100. The second accelerating unit (other accelerating unit) 1200 is positioned immediately under the speed reducer (speed reducing unit) 1100.

As shown in FIG. 11, the brake mechanism 2000 has a brake axis F2000 parallel to the horizontal axis (speed reducing central axis) F1000. The brake axis F2000 of the brake mechanism 2000 and the horizontal axis (speed reducing central axis) F1000 are parallel to each other.

As shown in FIG. 11, the rotation transmitting portion 3000 is connected to the outer cylinder 211 of the speed reducer (speed reducing unit) 1100 and the second accelerating unit (other accelerating unit) 1200. As in the fifth embodiment, the rotation transmitting portion 3000 may include a first brake output gear 3011 connected coaxially with the outer cylinder 211 of the speed reducer (speed reducing unit) 1100 and a second brake output gear 3012. The axis of the second brake output gear 3012 may be positioned below the axis of the first brake output gear 3011.

The brake mechanism 2000 may be positioned to be supported by a portion of the base block (leg portion) 1011 that is positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100, such that the brake mechanism 2000 is supported by the base block (leg portion) 1011.

The brake mechanism 2000 applies a braking force to the speed reducer (speed reducing unit) 1100 via the rotation transmitting portion 3000 and the outer cylinder 211 to brake the speed reducer (speed reducing unit) 1100. This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The second accelerating unit (other accelerating unit) 1200 is supported by the base block (leg portion) 1011. The second accelerating unit (other accelerating unit) 1200 penetrates the base block (leg portion) 1011 in the direction along the horizontal axis (speed reducing central axis) F1000. The second accelerating unit (other accelerating unit) 1200 is constituted by an eccentric oscillating speed reducer. The second accelerating unit (other accelerating unit) 1200 may be configured in different manners, for example, as a speed reducer including a planetary gear mechanism.

In the present embodiment, it is supposed that the second accelerating unit (other accelerating unit) 1200 has a large speed increasing ratio (reduction ratio), or a large torque ratio. The second accelerating unit 1200 may be configured in the same manner as the speed reducing unit 100 in the first to third embodiments shown in FIGS. 1 to 5. The second accelerating unit (other accelerating unit) 1200 is connected to the brake unit 1030.

In the second accelerating unit (other accelerating unit) 1200, the second brake output gear 3012 of the rotation transmitting portion 3000 is connected to the outer cylinder 211, which is positioned on the output side of the second accelerating unit (other accelerating unit) 1200 as a speed reducer, that is, the input side of the same as a speed-increasing gear. Further, in the second accelerating unit 1200, the brake gear 502 of the brake unit 1030 is connected to the center gear 500, which is positioned on the input side of the second accelerating unit 1200 as a speed reducer, that is, the output side of the same as a speed-increasing gear. When a rotational driving force is output from the second accelerating unit (other accelerating unit) 1200 to the brake gear 502, the rotational driving force is output at an increased speed. The brake gear 502 is configured as an accelerating unit 1020.

The brake unit 1030 includes the non-excitation brake 31, as does the brake unit 30 in the first to third embodiments shown in FIGS. 1 to 5. The non-excitation brake 31 of the brake unit 1030 is connected to a control unit 4000 that serves as a brake power source. The non-excitation brake 31 is not limited to a particular configuration but may be formed of any known non-excitation brake. Similarly to the second accelerating unit (other accelerating unit) 1200, the brake unit 1030 is supported by the base block (leg portion) 1011. Alternatively, the brake unit 1030 may be supported by the second accelerating unit (other accelerating unit) 1200, not by the base block (leg portion) 1011.

As in the fifth embodiment, when the supply of electricity from the control unit 4000 to the motor 1002 is stopped, the supply of electricity to the non-excitation brake 31 is stopped at the same time. Alternatively, a sensor may be provided to sense that the supply of electricity from the control unit 4000 to the motor 1002 is stopped, and in response to the output of this sensor, the supply of electricity to the non-excitation brake 31 may be stopped.

In the transmission path extending via the rotation transmitting portion 3000 and the second accelerating unit (other accelerating unit) 1200 to the brake unit 1030, the second accelerating unit (other accelerating unit) 1200 accelerates the drive rotation and transmits the accelerated drive rotation to the brake unit 1030. In other words, the rotation transmitting portion 3000 and the second accelerating unit 1200 operate as the accelerating unit 1020 in the transmission path extending from the outer cylinder 211 of the speed reducer (speed reducing unit) 1100 to the brake unit 1030 of the brake mechanism 2000.

The drive rotation is accelerated in the rotation transmitting portion 3000 and the second accelerating unit 1200. Accordingly, in the transmission path extending from the outer cylinder 211 of the speed reducer (speed reducing unit) 1100 to the brake unit 1030, the rotation transmitting portion 3000 and the second accelerating unit 1200 constitute the accelerating unit 1020. The accelerating unit 1020 accelerates the rotational drive (input rotation) from the outer cylinder 211 of the speed reducer (speed reducing unit) 1100 and transmits it to the brake unit 1030, in the speed-reducing drive transmission path within the speed reducing mechanism 1000.

In the manufacturing apparatus (speed reducing mechanism) 1000 of the present embodiment, the rotary block (tilting portion) 1013 is supported at its opposite ends by the bearing 1012a and the speed reducer 1100 and the motor 1002. The input shaft 1102 is supported by the bearing 1103. Therefore, the rotary block (tilting portion) 1013 is supported by the bearing 1103 and the bearing 1012a. In this way, in the manufacturing apparatus (speed reducing mechanism) 1000, the rotary block (tilting portion) 1013 serving as a positioner is supported by the bearing 1103 and the bearing 1012a as if it forms a multistage rotatable shaft along with the input shaft 1102, the speed reducer 1100, and the output portion 1211. This arrangement requires a smaller number of parts to support the rotary block (tilting portion) 1013.

In the manufacturing apparatus (speed reducing mechanism) 1000 of the present embodiment, the motor 1002 as the driving source is supplied with electric power from the control unit 4000 for driving. The motor 1002 thus drives to rotate the rotary block (tilting portion) 1013 about the horizontal axis F1000 via the speed reducing unit 1100, so as to retain a predetermined tilt angle of the rotary block (tilting portion) 1013 about the horizontal axis F1000.

At this time, the drive rotation of the motor 1002 is controlled by a signal from the control unit 4000 such that the rotary block (tilting portion) 1013 is tilted about the horizontal axis F1000 to a predetermined tilt angle. The control unit 4000 controls the motor 1002 to be braked, thereby stopping the rotary block (tilting portion) 1013 to retain and fix its tilt angle.

In the rotary block (tilting portion) 1013 retained at the predetermined tilt angle, the turntable 1003 tilted about the horizontal axis F1000 is rotated about the table axis F1003 by the table driving motor 1004 controlled by the control unit 4000, to set the rotational position of the turntable 1003 about the table axis F1003. In this way, the work mounted on the work supporting surface 1003a of the turntable 1003 is moved dually about the horizontal axis F1000 and the table axis F1003 to the working position and into a predetermined posture. The manufacturing apparatus (speed reducing mechanism) 1000 of the present embodiment operates as a positioner capable of position control dually about the horizontal axis F1000 and the table axis F1003 for a working process.

At this time, when the drive rotation produced by the motor 1002 as the driving source is transmitted via the speed reducing unit 1100 at a reduced speed to rotate and tilt the rotary block (tilting portion) 1013, the outer cylinder 211 of the speed reducer (speed reducing unit) 1100 rotates integrally with the rotary block (tilting portion) 1013 and the output portion 1211.

The rotation of the outer cylinder 211 of the speed reducer (speed reducing unit) 1100 is transmitted to the second accelerating unit (other accelerating unit) 1200 of the brake mechanism 2000 via the rotation transmitting portion 3000. Specifically, the rotation of the outer cylinder 211 of the speed reducer (speed reducing unit) 1100 is transmitted at an increased speed to the brake unit 1030 of the brake mechanism 2000 via the rotation transmitting portion 3000 and the second accelerating unit (other accelerating unit) 1200 of the brake mechanism 2000.

While the motor 1002 as the driving source is supplied with electricity from the control unit 4000 to brake or drive the rotary block (tilting portion) 1013, the brake unit 1030 is also supplied with electricity. The brake unit 1030 operates with a non-excitation brake. Therefore, the brake unit 1030 switches its operation when supplied with electricity in association with the electricity supply from the control unit 4000 to the motor 1002. Alternatively, the brake unit 1030 switches its operation in accordance with the sensed state of the electricity supply from the control unit 4000 to the motor 1002.

The brake unit 1030 does not operate while the motor 1002 is supplied with electricity from the control unit 4000. The brake unit 1030 thus does not produce a braking force to be imparted from the brake unit 1030 to the second accelerating unit (other accelerating unit) 1200. The motor 1002 sets the tilt state of the rotary block (tilting portion) 1013.

Next, suppose that the braking of the rotary block (tilting portion) 1013 by the motor 1002 is stopped suddenly. This can be caused by interrupted power supply from the control unit 4000 such as in a power failure.

A possible case is that the electric power supply from the control unit 4000 is stopped and the motor 1002 is put into the de-energized state. In this case, the rotary block (tilting portion) 1013 is released from the braking from the motor 1002. If, for example, the rotary block (tilting portion) 1013 and/or the work supported thereon has a large weight, the rotary block (tilting portion) 1013 remaining unbraked may freely rotate about the horizontal axis F1000 under its own weight.

At the moment the motor 1002 is transferred from the energized state to the de-energized state, the rotary block (tilting portion) 1013 is transferred from the state in which it is braked or driven by the motor 1002 to the state in which it is not under such braking or driving. At this moment, the brake unit 1030 formed of the non-excitation brake switches from the state in which it does not produce a braking force to be imparted from the brake unit 1030 to the second accelerating unit (other accelerating unit) 1200 to the state in which it performs the braking. The brake unit 1030 switches to the state in which it produces a braking force to be imparted to the second accelerating unit (other accelerating unit) 1200 for the braking.

Therefore, the rotation of the outer cylinder 211 of the speed reducer (speed reducing unit) 1100 is braked via the second accelerating unit (other accelerating unit) 1200 and the rotation transmitting portion 3000. In this way, if the motor 1002 is de-energized, the braking force of the brake unit 1030 stops the rotary block (tilting portion) 1013 integrated with the outer cylinder 211 and the output portion 1211, to fix the tilt angle of the rotary block (tilting portion) 1013.

In the manufacturing apparatus (speed reducing mechanism) 1000 of the present embodiment, the speed reducer (speed reducing unit) 1100, the rotation transmitting portion 3000, and the brake mechanism 2000 are positioned to include the same plane substantially orthogonal to the horizontal axis F1000 and are connected in mesh with each other. In this way, the brake unit 1030 is positioned to overlap the speed reducer (speed reducing unit) 1100 in the axial direction along the horizontal axis F1000.

In the manufacturing apparatus (speed reducing mechanism) 1000 of the present embodiment, the speed reducer (speed reducing unit) 1100, the rotation transmitting portion 3000, and the brake mechanism 2000 overlap each other in the axial direction along the horizontal axis F1000 and are supported by the base block (leg portion) 1011. The rotation transmitting portion 3000 and the brake mechanism 2000 are positioned immediately under the speed reducer (speed reducing unit) 1100. Accordingly, the speed reducing mechanism 1000 of the present embodiment can be downsized in the direction along the speed reducing central axis (central axis) F1002.

In the speed reducing mechanism 1000 of the present embodiment, the speed reducer (speed reducing unit) 1100, the rotation transmitting portion 3000, and the brake mechanism 2000 are disposed at the same side of the base block (leg portion) 1011 in the direction along the speed reducing central axis (central axis) F1002, and therefore, the speed reducing mechanism 1000 can be downsized. Further, it is not necessary to provide a cover or the like in the vicinity of the retainer 1012, which is disposed at the other side of the base block (leg portion) 1011 in the direction along the horizontal axis F1000, and therefore, the number of parts can be reduced.

The speed reducing mechanism 1000 of the present embodiment have added thereto the brake mechanism 2000 and the rotation transmitting portion 3000, and therefore, the speed reducing mechanism 1000 that operates as an existing positioner or the like can have an emergency stop function. Further, in adding the brake mechanism 2000 and the rotation transmitting portion 3000, it is required only to mount these components to the base block (leg portion) 1011. This provides better work efficiency. At the same time, the speed reducing mechanism 1000 can be downsized while having the emergency stop function.

Figure 14:
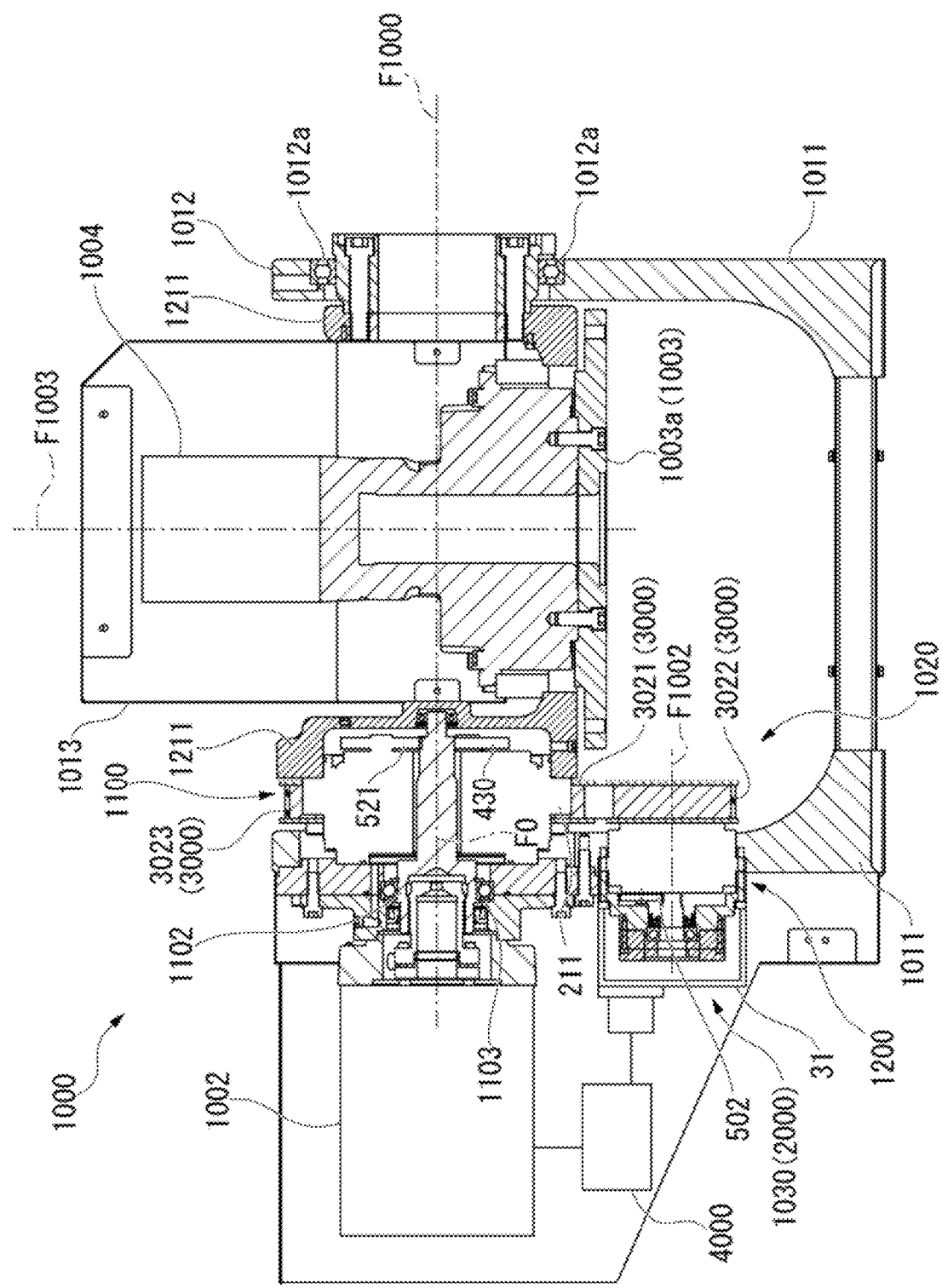
FIG. 14 is a sectional view of a tenth embodiment of the brake mechanism and the speed reducing mechanism according to the present invention, shown along the axial direction.

A tenth embodiment of the brake mechanism and the speed reducing mechanism according to the invention will be hereinafter described with reference to the accompanying drawings. FIG. 14 is a schematic view of the brake mechanism and the speed reducing mechanism according to the present embodiment, shown along the axial direction. For the present embodiment, the same constituents as in the ninth embodiment described above are denoted by the same reference numerals and may not be described here.

As shown in FIG. 14, the rotation transmitting portion 3000 of the present embodiment may include a first brake output pulley 3021 connected to the speed reducer (speed reducing unit) 1100 and a second brake output pulley 3022 connected via a winding belt 3023 wound around the first brake output pulley 3021. The second brake output pulley 3022 is connected to the second accelerating unit (other accelerating unit) 1200 of the brake mechanism 2000. The second brake output pulley 3022 has a rotation axis parallel to the horizontal axis (speed reducing central axis) F1000. The rotation axis of the second brake output pulley 3022 may be aligned with the brake axis F2000. The axis of the second brake output sprocket 3022 may be positioned below the axis of the first brake output sprocket 3021.

The rotation transmitting portion 3000 may include a first brake output sprocket 3021, a second brake output sprocket 3022, and a winding chain 3023 in place of the first brake output pulley 3021, the second brake output pulley 3022, and the winding belt 3023.

As shown in FIG. 14, the brake mechanism 2000 may be positioned to be supported by a portion of the base block (leg portion) 1011 that is positioned vertically below the speed reducer (speed reducing unit) 1100. The position of the brake mechanism 2000 is not limited to this position. The brake mechanism 2000 may be disposed at any position in the circumferential direction around the horizontal axis (speed reducing central axis) F1000 relative to the speed reducer (speed reducing unit) 1100, such that the brake mechanism 2000 is supported by the base block (leg portion) 1011.

The first brake output pulley 3021 may be connected coaxially with the outer cylinder 211 of the speed reducer (speed reducing unit) 1100. The respective axes of the first brake output pulley 3021 and the second brake output pulley 3022 may be at a predetermined distance to each other.

The brake mechanism 2000 applies a braking force to the speed reducer (speed reducing unit) 1100 via the rotation transmitting portion 3000 and the outer cylinder 211 to brake the speed reducer (speed reducing unit) 1100. This makes it possible to connect the brake mechanism 2000 to the speed reducer (speed reducing unit) 1100 without affecting the configuration of the output portion 1211, such that the brake mechanism 2000 applies its braking force to the speed reducer (speed reducing unit) 1100.

The rotation transmitting portion 3000 is appropriately shaped, positioned, and provided with a gear ratio such that the rotation can be transmitted, and thus the torque can be transmitted between the speed reducer (speed reducing unit) 1100 and the brake mechanism 2000, and it is not limited whether the rotation transmitting portion 3000 accelerates the rotation. It is preferable that the rotation transmitting portion 3000 is shaped, positioned, and provided with a gear ratio so as to accelerate the drive rotation between the speed reducer (speed reducing unit) 1100 and the brake mechanism 2000.

The manufacturing apparatus (speed reducing mechanism) 1000 of the present embodiment includes the sensing device for sensing that the speed reducing unit 1100 is normally braking or driving the rotary block (tilting portion) 1013. An example of this sensing device is a combination of a sensor 4003 for sensing the rotation angle of the second brake output pulley 3022 or the second brake output sprocket 3022 and a sensor for sensing the drive state of the motor 1002. The sensor for sensing the drive state of the motor 1002 may be included in the control unit 4000. Alternatively, the sensor 4003 may sense the winding position of the winding belt 3023 or the winding chain 3023.

When the sensing device 4003 or the like and the control unit 4000 determine that at least one of the energization of the motor 1002 and the retention of the tilt angle of the rotary block (tilting portion) 1013 is no longer maintained, the control unit 4000 stops the supply of electricity to the brake unit 1030. Therefore, the brake unit 1030 is switched to the non-excitation state for operation.

In the manufacturing apparatus (speed reducing mechanism) 1000 of the present embodiment, the first brake output pulley 3021 disposed on the periphery of the outer cylinder 211 of the speed reducer (speed reducing unit) 1100 and the second brake output pulley 3022 are rotated synchronously with each other via the winding belt 2023. In this way, the brake unit 1030 is positioned to overlap the speed reducer (speed reducing unit) 1100 in the axial direction along the horizontal axis F1000. The braking force of the brake unit 1030 thus stops the rotary block (tilting portion) 1013 to fix its tilt angle.

The brake mechanism 2000 may be disposed at any such position that the first brake output pulley 3021 and the second brake output pulley 3022 are synchronized with each other via the winding belt 2023, irrespective of the distance therebetween.

This embodiment can produce the same effects as the fifth and sixth embodiments described above. Further, since the brake axis F2000 of the brake mechanism 2000 and the horizontal axis (speed reducing central axis) F1000 can be spaced apart from each other, the degree of freedom of positioning the brake mechanism 2000 is increased.

What is claimed is:

1. A speed reducing mechanism, comprising:
a speed reducer including a center gear, the speed reducer configured to decelerate input rotation transmitted to the center gear;
an accelerator including a brake idler gear connected to the center gear; and
a brake unit including a brake gear connected to the brake idler gear, and a brake connected to the brake gear, the brake unit configured to apply a braking force for braking the accelerator,
wherein the accelerator is configured to accelerate rotation from the center gear and to transmit the rotation to the brake unit.

2. The speed reducing mechanism of claim 1, wherein the brake idler gear and the brake gear have rotation axes parallel to each other, and
wherein the accelerator and the brake unit are positioned to overlap each other in an axial direction along a central axis of the center gear.

3. The speed reducing mechanism of claim 2, wherein the brake idler gear has a rotation axis parallel to the center gear, and
wherein the brake unit is configured to brake the brake idler gear.

4. The speed reducing mechanism of claim 2, wherein the speed reducing unit includes the center gear and a spur gear, the center gear rotating about the speed reducing central axis, the spur gear having a rotation axis parallel to the center gear and rotated by the center gear, and
wherein the brake unit brakes the spur gear.

5. The speed reducing mechanism of claim 2, wherein the speed reducing unit includes the center gear configured to rotate about the speed reducing central axis, and
wherein the brake unit brakes the center gear.

6. The speed reducing mechanism of claim 2, wherein the speed reducing unit includes the center gear and an outer cylinder, the center gear rotating about the speed reducing central axis, the outer cylinder being rotated about the speed reducing central axis by the center gear, and
wherein the brake unit brakes the outer cylinder.

7. The speed reducing mechanism of claim 2, further comprising: another accelerator for accelerating an output of the speed reducing unit,
wherein the braking force of the brake unit is applied to the other accelerator.

8. The speed reducing mechanism of claim 7, wherein the speed reducing unit includes the center gear and an outer cylinder, the center gear rotating about the speed reducing central axis, the outer cylinder being rotated about the speed reducing central axis by the center gear, and wherein the speed reducing mechanism further comprises:
a first output shaft rotated by the outer cylinder;
a second output shaft parallel to the first output shaft;
a first output gear and a second output gear connecting between the first output shaft and the second output shaft and configured to transmit rotation therebetween; and
another accelerator connected to the second output shaft and configured to accelerate an output of the speed reducing unit, and
wherein the other accelerator is braked by the braking force of the brake unit connected to the other accelerator.

9. The speed reducing mechanism of claim 8, wherein the first output shaft is connected at one end thereof to a rotational driving source for inputting a rotational driving force via the speed reducing unit,
wherein the first output shaft is connected at the other end thereof to the other accelerating unit via the first output gear and the second output gear, and
wherein the first output shaft includes a tilting portion between the one end and the other end thereof.

10. The speed reducing mechanism of claim 9, further comprising a leg portion rotatably supporting the first output shaft serving as a tilting shaft,
wherein the leg portion supports the second output shaft and the brake unit.

11. The speed reducing mechanism of claim 1, wherein the speed reducer and the brake unit are positioned to overlap each other in a circumferential direction around a central axis of the center gear.

12. A speed reducing mechanism comprising:
a speed reducing unit for decelerating input rotation;
an accelerator for accelerating rotation from the speed reducing unit; and
a brake unit for applying a braking force to the accelerator,
wherein the speed reducing unit includes:
a center gear configured to rotate about a speed reducing central axis that constitutes a rotation center of the speed reducing unit;
an idler gear connected to the center gear;
a crankshaft integrated with the idler gear;
a cam provided on the crankshaft;
an external-tooth gear configured to oscillate and rotate around the speed reducing central axis by the cam; and
an outer cylinder including an internal-tooth gear meshing with the external-tooth gear and configured to rotate around the speed reducing central axis,
wherein the speed reducing mechanism further comprises:
a first output shaft rotated by the outer cylinder;
a second output shaft parallel to the first output shaft;
a first output gear and a second output gear connecting between the first output shaft and the second output shaft and configured to transmit rotation therebetween; and
another accelerator connected to the second output shaft and configured to accelerate an output of the speed reducing unit, and
wherein the first output shaft is connected at one end thereof to a rotational driving source for inputting a rotational driving force via the speed reducing unit,
wherein the first output shaft is connected at the other end thereof to the other accelerating unit via the first output gear and the second output gear,
wherein the first output shaft includes a tilting portion between the one end and the other end thereof,
wherein the speed reducing mechanism further comprises a leg portion rotatably supporting the first output shaft serving as a tilting shaft,
wherein the leg portion supports the second output shaft and the brake unit, and
wherein the other accelerator is braked by the braking force of the brake unit connected to the other accelerator.

13. A speed reducing mechanism comprising:
a brake mechanism including an accelerator for accelerating input rotation and a brake unit for applying a braking force for braking the accelerator; and
a speed reducing unit for decelerating input rotation,
wherein the brake mechanism is connected to the speed reducing unit.

14. The speed reducing mechanism of claim 13, wherein the speed reducing unit has a speed reducing central axis that constitutes a rotation center, and
wherein the speed reducing unit and the accelerating unit are positioned to overlap each other in an axial direction along the speed reducing central axis.

15. The speed reducing mechanism of claim 14, wherein an axis of the accelerator and the speed reducing central axis are parallel to each other.

16. The speed reducing mechanism of claim 14, wherein an axis of the accelerator and the speed reducing central axis intersect each other.

17. The speed reducing mechanism of claim 15, wherein the speed reducing unit and the accelerating are connected to each other via a rotation transmitting portion.

18. The speed reducing mechanism of claim 17, wherein the rotation transmitting portion is formed of any one of: a brake output gear; a brake output pulley and a belt; and a brake output sprocket and a chain, so as to connect between the speed reducing unit and the accelerator.

19. The speed reducing mechanism of claim 17, wherein the rotation transmitting portion is connected to a periphery of the speed reducing unit.

20. The speed reducing mechanism of claim 19, wherein the speed reducing unit includes an outer cylinder configured to rotate about the speed reducing central axis, and
wherein the brake mechanism brakes the outer cylinder.

* * * * *